US012570410B2

(12) United States Patent
Mukae

(10) Patent No.: US 12,570,410 B2
(45) Date of Patent: Mar. 10, 2026

(54) FLYING OBJECT SURVEILLANCE SYSTEM, COMMUNICATION SATELLITE, AND SURVEILLANCE SATELLITE

(71) Applicant: Mitsubishi Electric Corporation, Tokyo (JP)

(72) Inventor: Hisayuki Mukae, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 66 days.

(21) Appl. No.: 18/280,476

(22) PCT Filed: Mar. 29, 2022

(86) PCT No.: PCT/JP2022/015493
§ 371 (c)(1),
(2) Date: Sep. 6, 2023

(87) PCT Pub. No.: WO2022/230560
PCT Pub. Date: Nov. 3, 2022

(65) Prior Publication Data
US 2024/0140618 A1     May 2, 2024

(30) Foreign Application Priority Data

Apr. 27, 2021     (JP) ................................. 2021-074817

(51) Int. Cl.
*B64G 1/10*         (2006.01)
*B64G 3/00*         (2006.01)
*H04H 20/00*        (2009.01)

(52) U.S. Cl.
CPC ......... *B64G 1/1028* (2023.08); *B64G 1/1085* (2013.01); *B64G 3/00* (2013.01); *H04H 20/00* (2013.01)

(58) Field of Classification Search
CPC ...... B64G 1/1028; B64G 1/1085; B64G 3/00; B64G 1/10; H04H 20/00
See application file for complete search history.

(56) References Cited

U.S. PATENT DOCUMENTS 5,046,006 A * 9/1991 Revord ................... B64G 3/00
                                                 89/1.1
2010/0038490 A1* 2/2010 Hofschuster ............. B64G 3/00
                                                 244/158.1

FOREIGN PATENT DOCUMENTS

JP        2008137439 A  *  6/2008  ............... B64G 1/66

OTHER PUBLICATIONS

International Search Report and Written Opinion mailed on May 17, 2022, received for PCT Application PCT/JP2022/015493, filed on Mar. 29, 2022, 11 pages including English Translation.

* cited by examiner

*Primary Examiner* — Zhitong Chen
(74) *Attorney, Agent, or Firm* — XSENSUS LLP

(57)                ABSTRACT

A surveillance satellite that has detected a significant high luminance generates launch sensing data indicating a launch time point corresponding to a detection time point, a launch coordinate value expressing a position at which the significant high luminance was detected, and a line-of-sight vector at the detection time point and containing surveillance data at the detection time point and transmits the launch sensing data. A communication satellite that passes through a point in a communication range with respect to the surveillance satellite to transmit the launch sensing data receives the launch sensing data and transmits the launch sensing data to remaining communication satellites via a satellite communication network.

31 Claims, 20 Drawing Sheets

100:FLYING OBJECT SURVEILLANCE SYSTEM

101:SURVEILLANCE SATELLITE CONSTELLATION 110          110          . . .

102:COMMUNICATION SATELLITE CONSTELLATION 120          120          . . .

104
COUNTERMEASURE ASSET

104
COUNTERMEASURE ASSET

103:TARGET FLYING OBJECT

130
GROUND SYSTEM

131
SATELLITE SUPERVISORY DEVICE

132
COMMUNICATION DEVICE

133
SURVEILLANCE DATABASE

Fig. 4

100:FLYING OBJECT SURVEILLANCE SYSTEM

LAUNCH SENSING t 5
t 4
t 3
t 2
t 1
t 0

Fig.12

100.FLYING OBJECT SURVEILLANCE SYSTEM t 5 t 4 t 3 t 2 t 1 t 0

LAUNCH SENSING

Fig. 18

LAUNCH SENSING

FLYING OBJECT SURVEILLANCE SYSTEM, COMMUNICATION SATELLITE, AND SURVEILLANCE SATELLITE

CROSS-REFERENCE TO RELATED APPLICATIONS

This application is based on PCT filing PCT/JP2022/015493, filed Mar. 29, 2022, which claims priority from Japanese Patent Application No. 2021-074817, filed Apr. 27, 2021, the entire contents of each are incorporated herein by reference.

TECHNICAL FIELD

The present disclosure relates to surveillance of flying objects performed with using artificial satellites.

BACKGROUND ART

A flying object called an HGV performs intermittent jetting after launch, thereby changing its flight direction.

It is difficult to perform surveillance of such a flying object with a GEO early warning satellite, and a flying object countermeasure system using an LEO constellation is sought for.

Note that HGV stands for Hypersonic Glide Vehicle.

Note that GEO stands for Geostationary Orbit.

Note that LEO stands for Low Earth Orbit.

Patent Literature 1 discloses a surveillance satellite for performing exhaustive surveillance of an entire spherical surface of the earth with a small number of satellites orbiting in a low earth orbit.

CITATION LIST

Patent Literature

Patent Literature 1: JP 2008-137439 A

SUMMARY OF INVENTION

Technical Problem

An objective of the present disclosure is to make it possible to predict a flight path of a flying object by exchanging information between satellites through decentralized management of each satellite rather than by integral operation of a satellite constellation in a top-down manner.

Solution to Problem

A flying object surveillance system according to the present disclosure includes:

a surveillance satellite constellation constituted of a plurality of surveillance satellites; and a communication satellite constellation constituted of a plurality of communication satellites, each of the plurality of surveillance satellites comprising:

an infrared surveillance device to monitor infrared rays and to detect brightness;

a surveillance control device to generate launch sensing data when the infrared surveillance device detected a significant high luminance, the launch sensing data indicating a launch time point corresponding to a detection time point at which the significant high luminance was detected, a launch coordinate value expressing a position at which the significant high luminance was detected, and a line-of-sight vector of the infrared surveillance device at the detection time point, the launch sensing data containing surveillance data at the detection time point; and a communication device to transmit the launch sensing data, each of the plurality of communication satellites comprising a communication device to communicate the launch sensing data, wherein among the plurality of communication satellites, in a communication satellite that passes through a point in a communication range with respect to the surveillance satellite to transmit the launch sensing data, the communication device receives the launch sensing data and transmits the launch sensing data to remaining communication satellites of the plurality of communication satellites via a satellite communication network formed of the communication satellite constellation.

Advantageous Effects of Invention

According to the present disclosure, it is possible to predict a flight path of a flying object by exchanging information between satellites through decentralized management of each satellite rather than by integral operation of a satellite constellation in a top-down manner.

BRIEF DESCRIPTION OF DRAWINGS

FIG. 4 is a relationship diagram of the flying object surveillance system 100 in Embodiment 1.

FIG. 12 is a relationship diagram of the flying object surveillance system 100 in Embodiment 1.

US 12,570,410 B2

3

Figure 18:
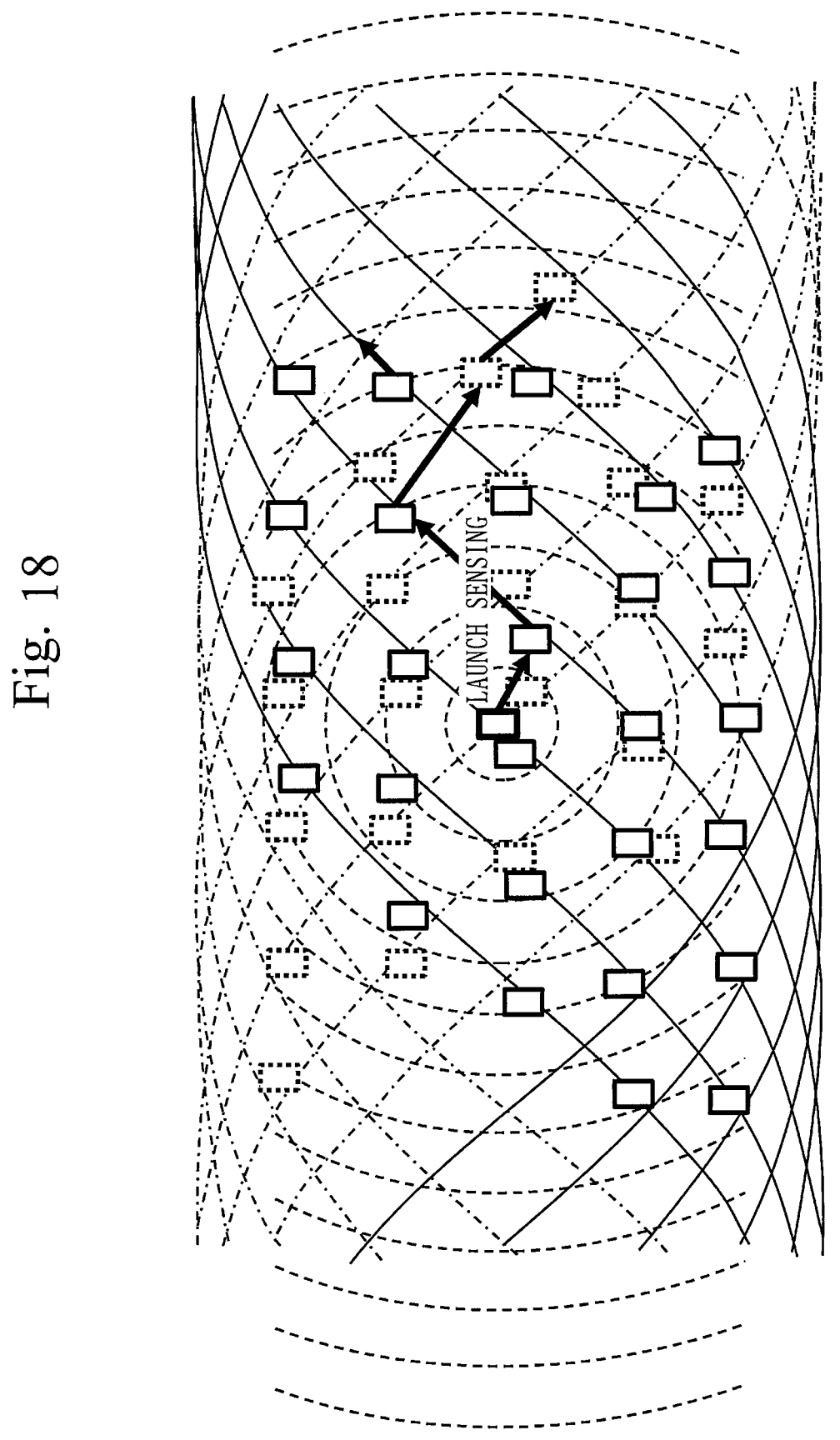

FIG. 18 is a diagram illustrating how depth-first search is carried out in Embodiment 1.

Figure 19:
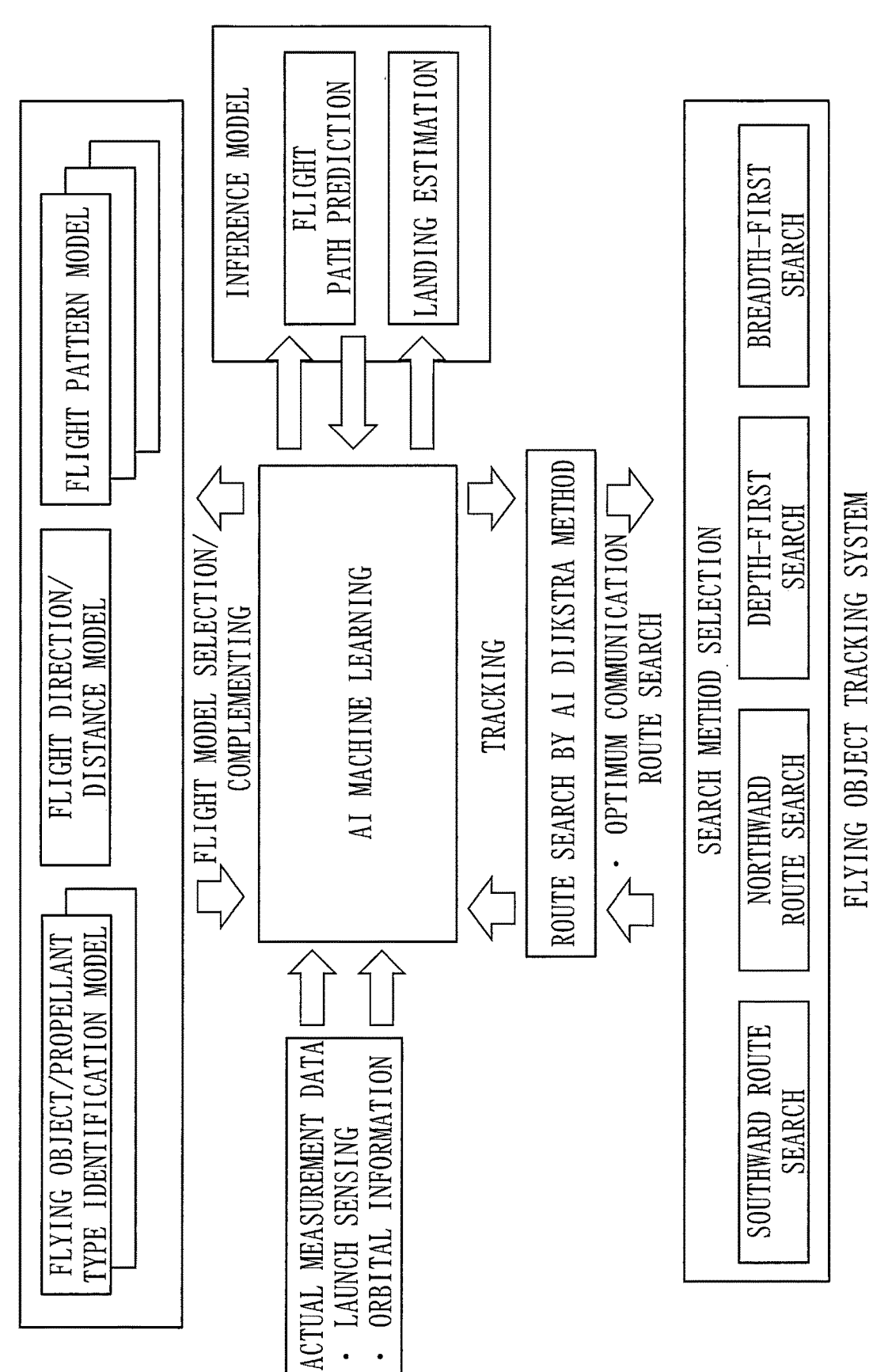

FIG. 19 is an overview diagram of a flying object tracking system in Embodiment 1.

Figure 20:
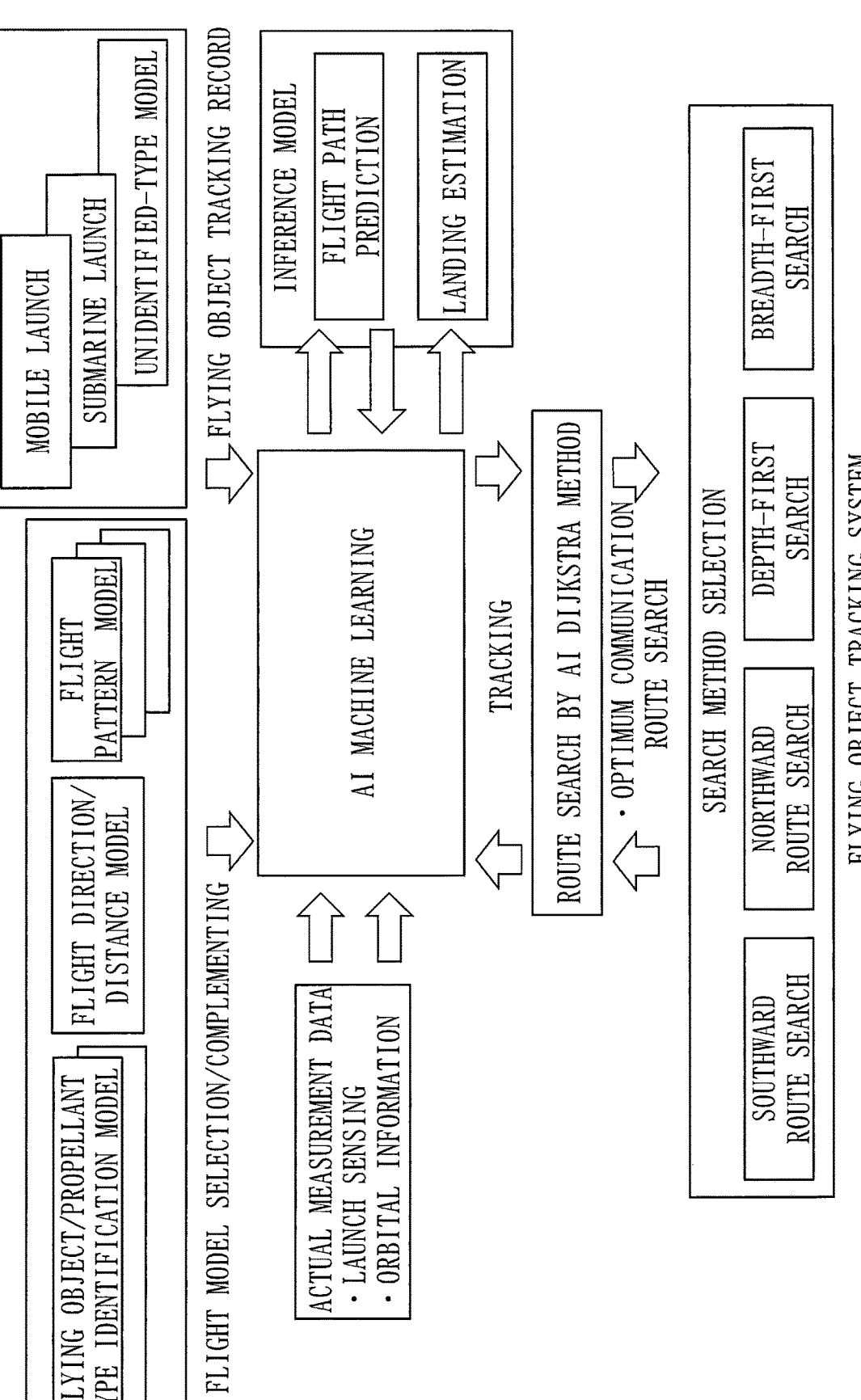

FIG. 20 is an overview diagram of a flying object tracking system in Embodiment 1.

DESCRIPTION OF EMBODIMENTS

In Embodiment and drawings, the same elements or equivalent elements are denoted by the same reference sign. Explanation of an element denoted by the same reference symbol as that of an explained element will be appropriately omitted or simplified.

Embodiment 1

A flying object surveillance system 100 will be described with referring to FIGS. 1 to 14.

*Description of Configurations*

Figure 1:
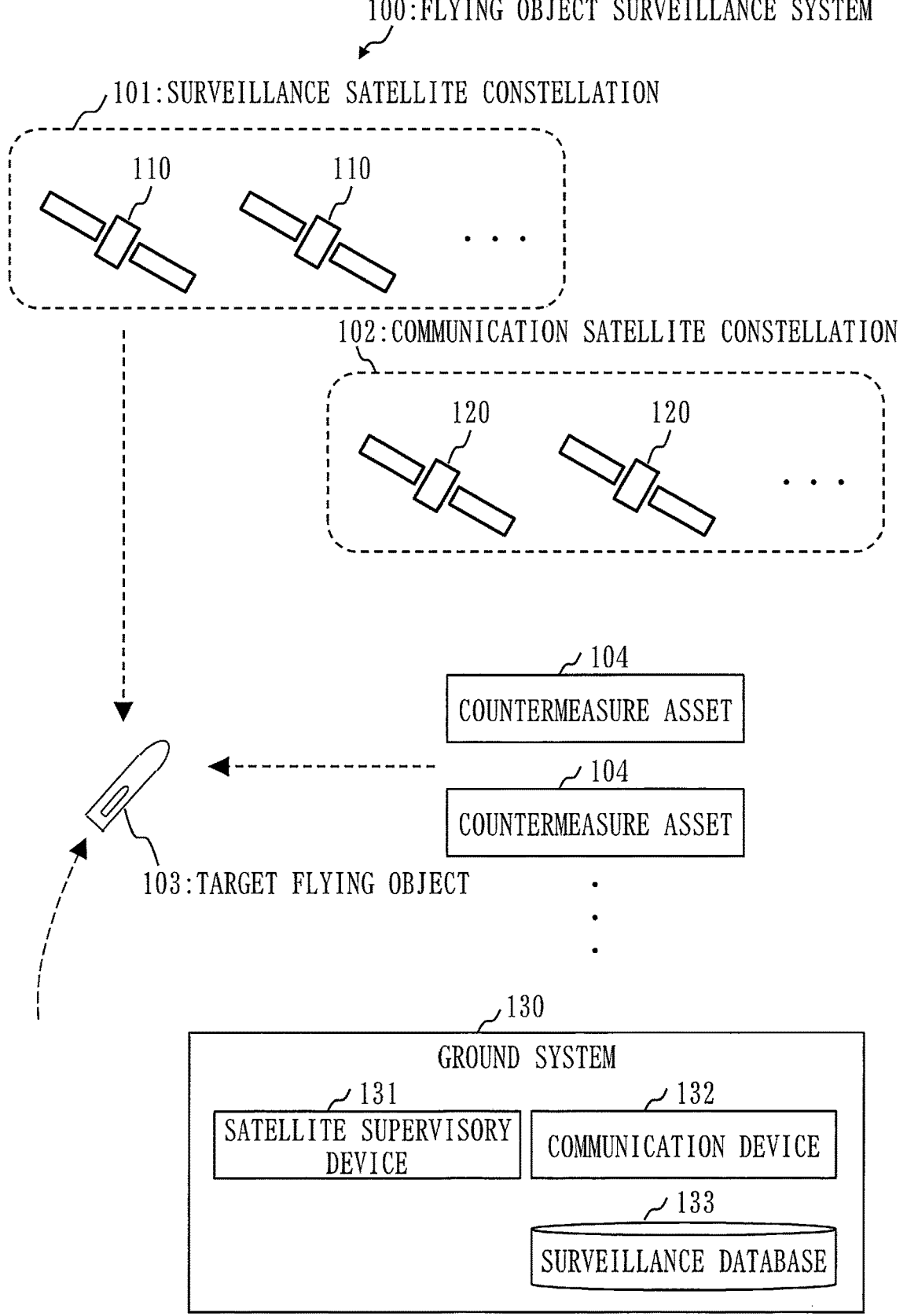
FIG. 1 is a configuration diagram of a flying object surveillance system 100 in Embodiment 1.

A configuration of the flying object surveillance system 100 will be described with referring to FIG. 1.

The flying object surveillance system 100 is a system to perform surveillance of a flying object. The flying object surveillance system 100 senses and tracks the flying object.

The flying object to be put under surveillance of the flying object surveillance system 100 will be referred to as a target flying object 103.

The flying object surveillance system 100 is provided with a surveillance satellite constellation 101, a communication satellite constellation 102, a ground system 130, and a plurality of countermeasure assets 104.

The surveillance satellite constellation 101 is constituted of a plurality of surveillance satellites 110.

The surveillance satellite 110 is an artificial satellite to perform surveillance of the target flying object 103.

The communication satellite constellation 102 is constituted of a plurality of communication satellites 120 and forms a communication network. The communication network formed of the communication satellite constellation 102 will be referred to as a "satellite communication network".

The communication satellite 120 is an artificial satellite for communication.

The ground system 130 is provided with a satellite supervisory device 131, a communication device 132, and a surveillance database 133.

The satellite supervisory device 131 is a computer provided with processing circuitry and generates various types of commands for the surveillance satellites 110, the communication satellites 120, and the countermeasure assets 104.

The communication device 132 communicates with each surveillance satellite 110, each communication satellite 120, and each countermeasure assets 104 individually. The communication device 132 may be constituted of a device for communication with the artificial satellites, and a device for communication with the countermeasure assets 104.

The surveillance database 133 is a database to store a plurality of flight path models, orbit data of each of the plurality of surveillance satellites 110, and orbit data of each of the plurality of communication satellites 120.

The flight path model is data expressing a flight path of a flying object to serve as a model, and contains a model identifier and a flight profile.

The plurality of flight path models individually contain model identifiers different from each other and flight profiles which express flight paths different from each other.

The flight profile expresses the flight path by indicating a relationship among a launch position, a flight direction, a time-series flight distance, and a time-series flight altitude.

The time-series flight distance is a flight distance in each elapsed time period.

The time-series flight altitude is a flight altitude in each elapsed time period.

The orbit data indicates orbital information of the artificial satellite.

The countermeasure asset 104 serves to take a countermeasure against the target flying object 103.

A specific example of the countermeasure asset 104 is an aircraft, a watercraft, or a vehicle.

The plurality of countermeasure assets 104 are deployed at different places.

Figure 2:
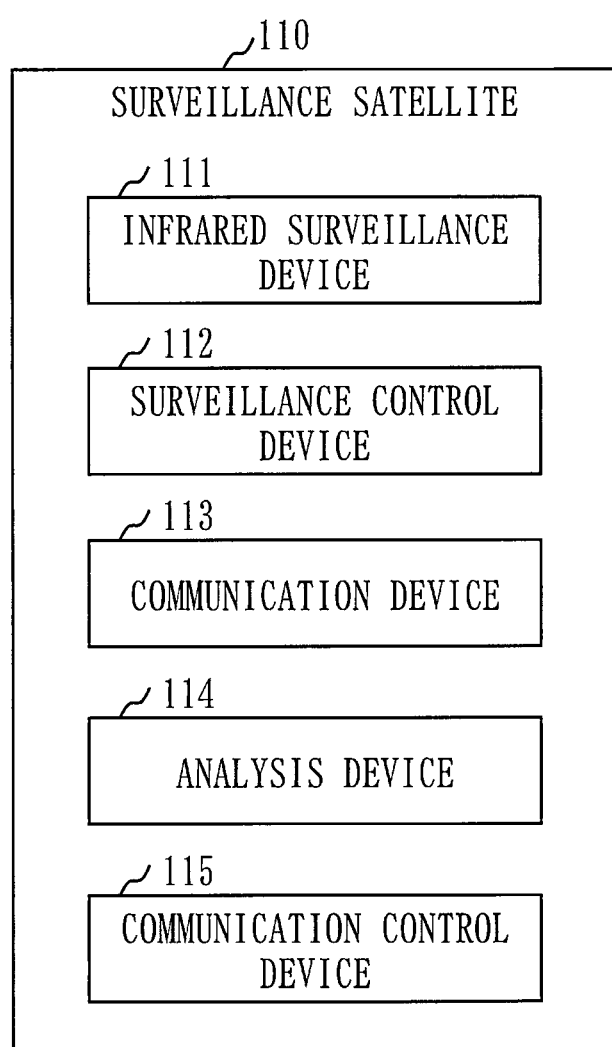
FIG. 2 is a configuration diagram of a surveillance satellite 110 in Embodiment 1.

A configuration of the surveillance satellite 110 will be described with referring to FIG. 2.

The surveillance satellite 110 is provided with an infrared surveillance device 111, a surveillance control device 112, a communication device 113, an analysis device 114, and a communication control device 115.

The infrared surveillance device 111 is a surveillance device that monitors infrared rays and detects brightness. Data obtained with the infrared surveillance device 111 will be referred to as "surveillance data".

The surveillance control device 112 is a computer provided with processing circuitry, and executes various types of processes for surveillance.

The communication device 113 communicates with each communication satellite 120, each surveillance satellite 110, the ground system 130, and each countermeasure asset 104 individually. The communication device 113 may be constituted of a device for communication with artificial satellites and a device for communication with ground facility.

The analysis device 114 is a computer provided with processing circuitry and analyzes a flight path of the target flying object 103.

The communication control device 115 is a computer provided with processing circuitry and executes various types of processes for communication.

Figure 3:
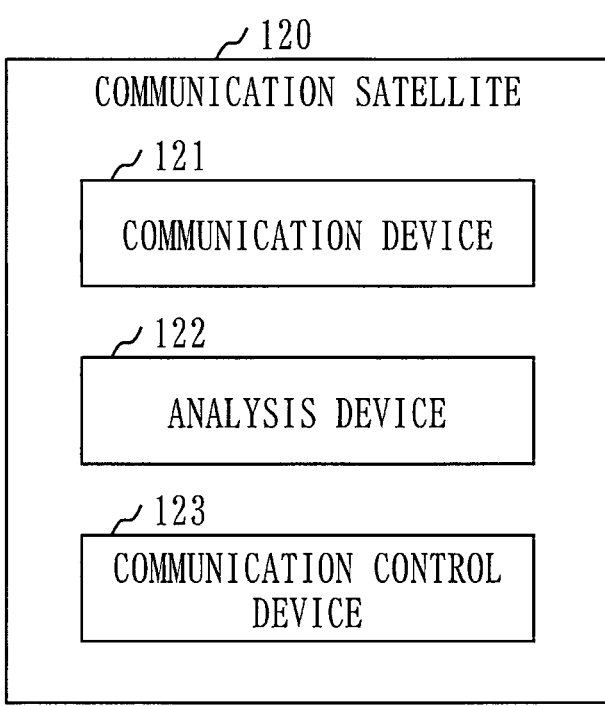
FIG. 3 is a configuration diagram of a communication satellite 120 in Embodiment 1.

A configuration of the communication satellite 120 will be described with referring to FIG. 3.

The communication satellite 120 is provided with a communication device 121, an analysis device 122, and a communication control device 123.

The communication device 121 communicates with each communication satellite 120, each surveillance satellite 110, the ground system 130, and each countermeasure asset 104 individually. The communication device 121 may be constituted of a device for communication with artificial satellites and a device for communication with the ground facility.

The analysis device 122 is a computer provided with processing circuitry and analyzes the flight path of the target flying object 103.

The communication control device 123 is a computer provided with processing circuitry and executes various types of processes for communication.

The processing circuitry will be described.

The processing circuitry may be dedicated hardware, or may be a processor that executes a program stored in the memory.

In the processing circuitry, some of the functions may be implemented by dedicated hardware, and the remaining functions may be implemented by software or firmware. That is, the processing circuitry can be implemented by one or a combination of hardware, software, and firmware.

The dedicated hardware is, for example, one or a combination of a single circuit, a composite circuit, a programmed processor, a parallel-programmed processor, an ASIC, and an FPGA.

Note that ASIC stands for Application Specific Integrated Circuit.

Note that FPGA stands for Field Programmable Gate Array.

*Description of Operations*

An operation of the flying object surveillance system 100 corresponds to a flying object surveillance method.

The various types of operations of the flying object surveillance system 100 will be described below.

*Operation (1)*

Each surveillance satellite 110 operates as follows.

The infrared surveillance device 111 monitors infrared rays and detects luminance.

The surveillance control device 112 generates launch sensing data of the target flying object 103 when the infrared surveillance device 111 detected a significant high luminance. The significant high luminance is, for example, a luminance equal to or more than a threshold value. The threshold value is determined on a basis of a temperature of the flying object at the time of launch.

The launch sensing data indicates a launch time point, a launch coordinate value, and a line-of-sight vector of the infrared surveillance device 111 at a detection time point, and contains surveillance data at the detection time point. The detection time point signifies a time point at which the significant high luminance was detected.

The launch time point corresponds to a time point (detection time point) at which the significant high luminance was detected.

The launch coordinate value expresses a position at which the significant high luminance was detected. The coordinate value is also called "position coordinate".

The communication device 113 transmits the launch sensing data.

The surveillance satellite 110 that has transmitted the launch sensing data will be referred to as "sensing/surveillance satellite".

Among the plurality of communication satellites 120, a communication satellite that passes through a point in a communication range with respect to the sensing/surveillance satellite will be referred to as "proximity communication satellite".

The proximity communication satellite operates as follows.

The communication device 121 receives the launch sensing data. Then, the communication device 121 transmits the launch sensing data to the remaining communication satellites 120 of the plurality of communication satellites 120 via the satellite communication network.

Figure 4:
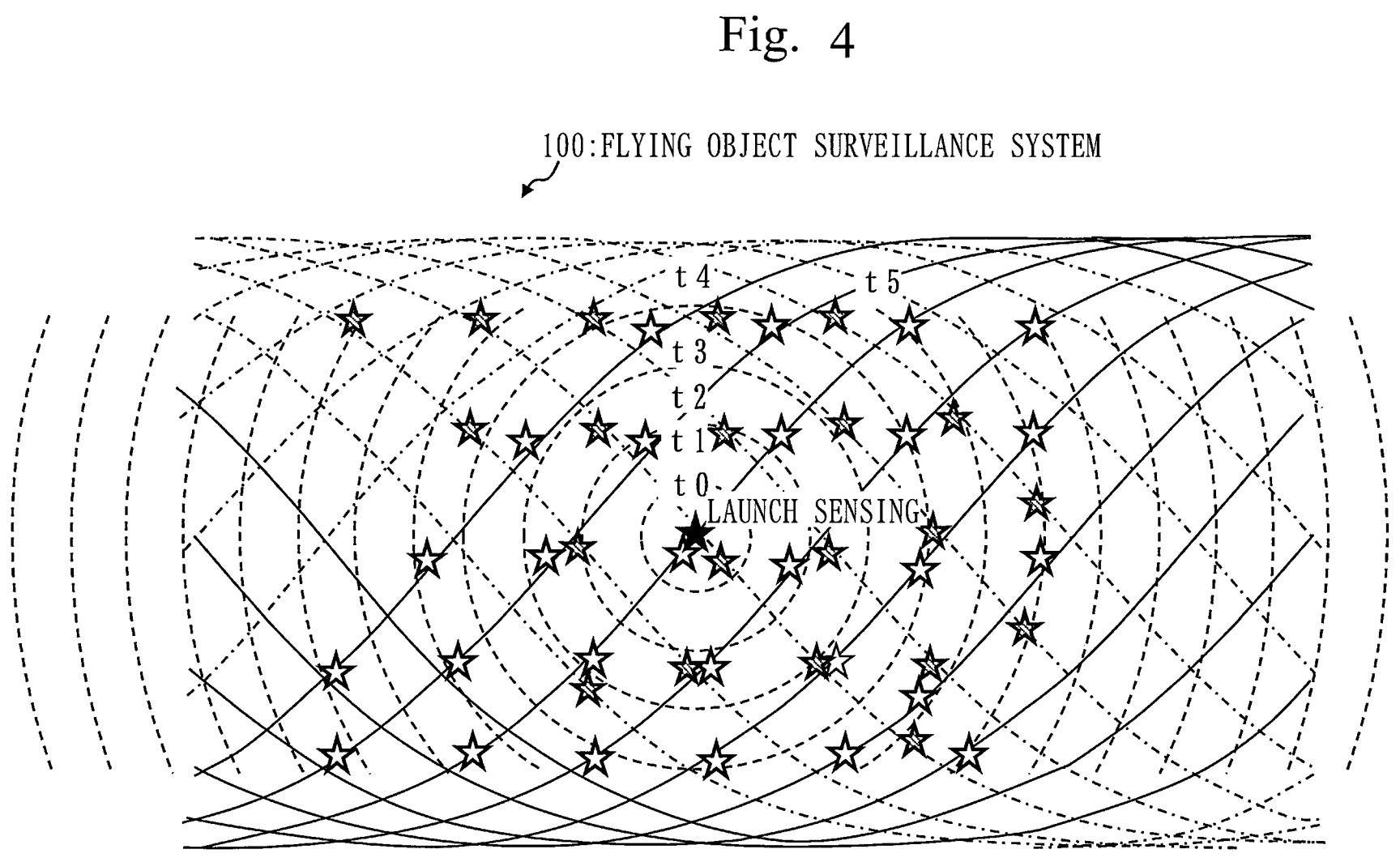

FIG. 4 indicates a relationship among the plurality of surveillance satellites 110, the plurality of communication satellites 120, and a launch point of the target flying object 103.

White star marks represent the surveillance satellites 110. Solid-line curves represent orbits of the surveillance satellites 110.

Hatched star marks represent the communication satellites 120. Alternate long-and-short-dashed curves represent orbits of the communication satellites 120.

A black star mark represents a launch point of the target flying object 103.

In the flying object surveillance system 100, the launch sensing data is transmitted to all the communication satellites 120.

*Operation (2)*

Each communication satellite 120 operates as follows.

First, the communication device 121 receives the plurality of flight path models from the ground system 130.

Next, per flight path model, the analysis device 122 sets the launch coordinate value indicated in the launch sensing data to the launch position in the flight profile.

Next, per flight path model, the analysis device 122 calculates an arrival coordinate value of the target flying object 103, an arrival time point of the target flying object 103, and flight coordinate values of the target flying object 103 at individual time points between the launch time point and the arrival time point, on a basis of the flight profile in which the launch coordinate value is set.

The arrival coordinate value expresses a position (target position) the target flying object 103 arrives at.

The arrival time point is time point tn at which the target flying object 103 arrives at the target position.

The launch time point is time point t0 at which the target flying object 103 was launched, and is indicated in the launch sensing data.

Then, per flight path model, the analysis device 122 generates prediction path data of the target flying object 103.

The prediction path data indicates the arrival coordinate value of the target flying object 103, the arrival time point of the target flying object 103, and the flight coordinate values of the target flying object 103 at individual time points (t1, t2, t3, tn) between the launch time point and the arrival time point. For example, the flight coordinate value is expressed as (tn, xn, yn, zn).

Figure 5:
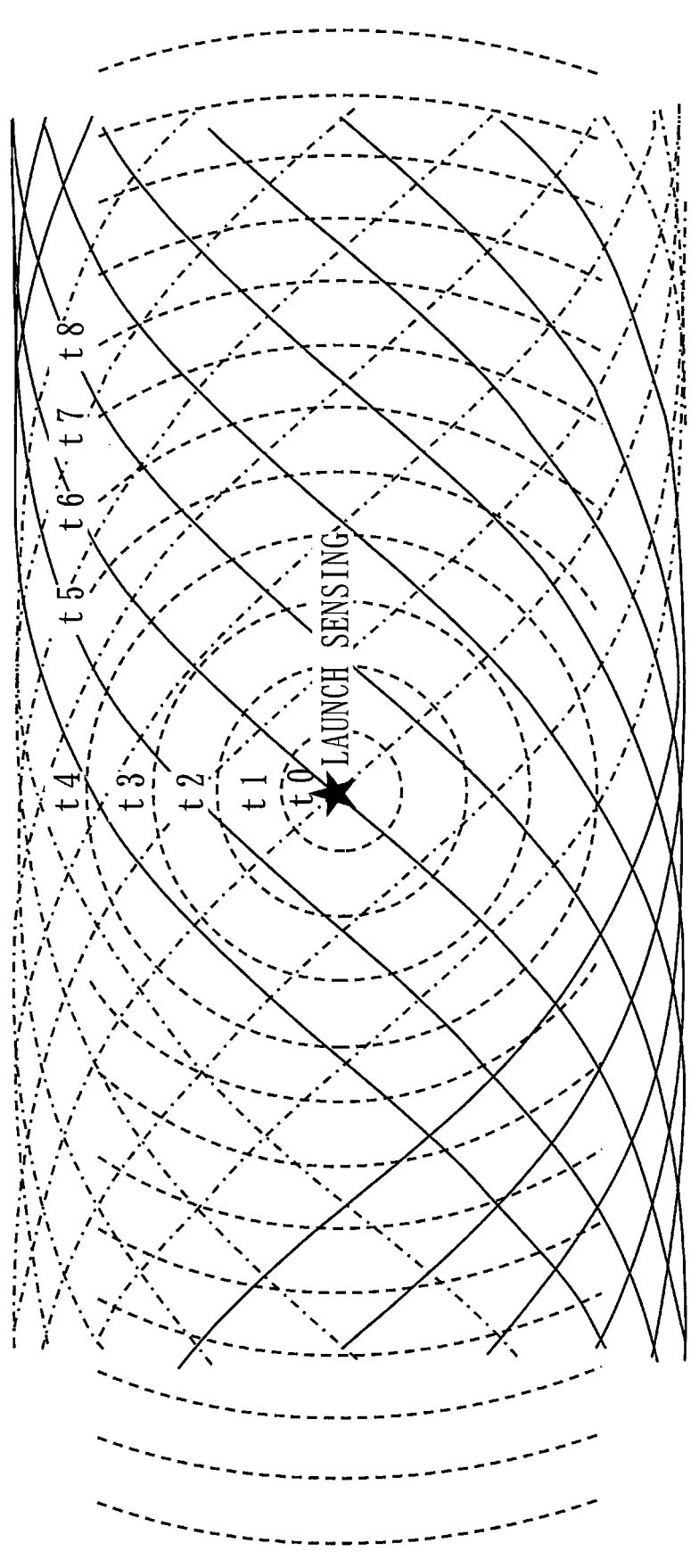
FIG. 5 is a diagram indicating plotting of launch coordinate values in Embodiment 1.

In FIG. 5, the launch coordinate value (black star mark) is plotted on the coordinates of the flying object surveillance system 100.

Figure 6:
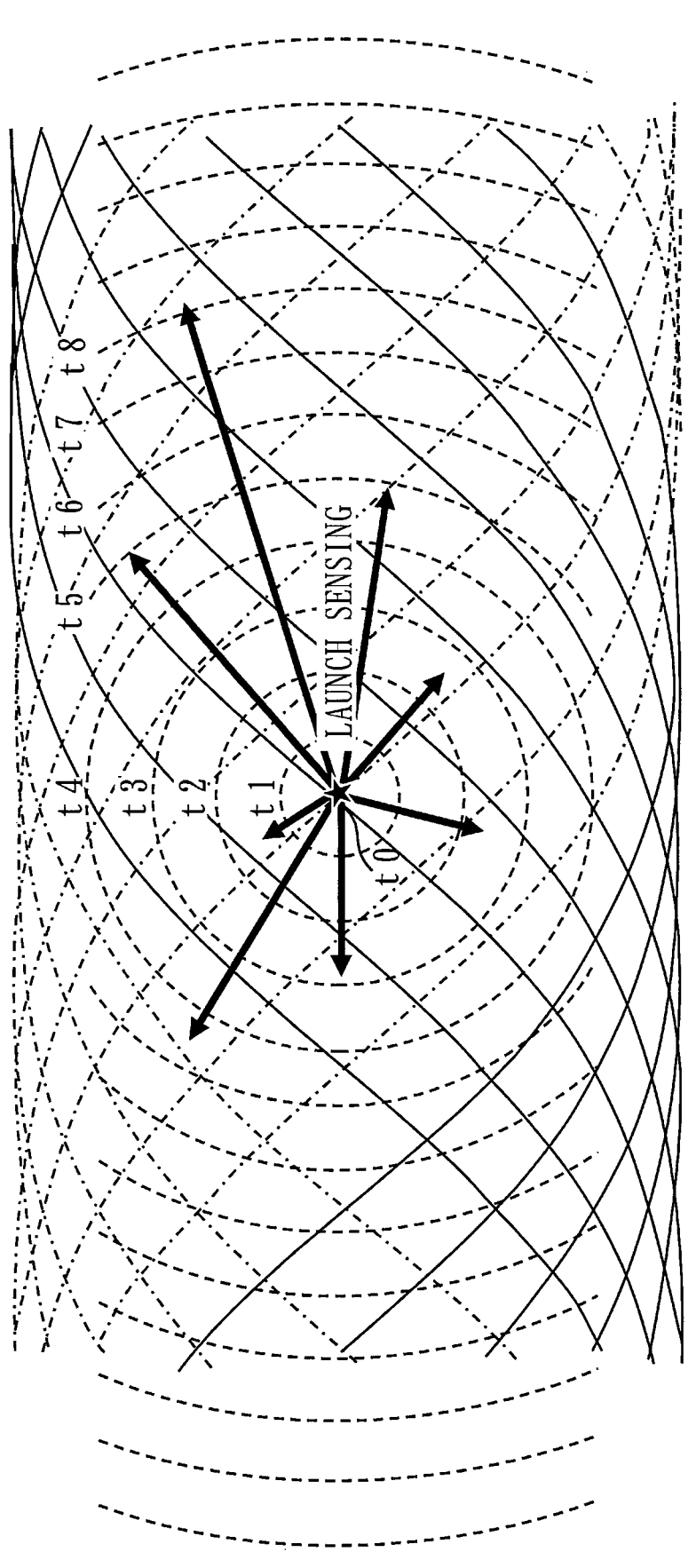
FIG. 6 is a diagram expressing prediction paths of a target flying object 103 in Embodiment 1.

In FIG. 6, arrow lines represent the prediction paths of the target flying object 103 per flight path model.

Per flight path model, (t1, x1, y1, z1), (t2, x2, y2, z2), (t3, x3, y3, z3), . . . , (tn, xn, yn, zn) are derived.

*Operation (3)*

Each communication satellite 120 operates as follows.

The communication device 121 receives orbit data of the communication satellite 120 from the ground system 130. The orbit data indicates a coordinate value (tk, xk, yk, zk) of an artificial satellite at each time point tk.

Per flight path model, the analysis device 122 determines whether the communication satellite 120 will pass over the target flying object 103 on a basis of orbit data of the communication satellite 120 and the prediction path data.

If the analysis device 122 determines that the communication satellite 120 will pass over the target flying object 103, the analysis device 122 calculates a passage prediction time point and a passage prediction coordinate value on a basis of the orbit data of the communication satellite 120 and prediction path data. Then, the analysis device 122 generates passage prediction data.

The passage prediction time point is a prediction time point at which the communication satellite 120 passes over the target flying object 103.

The passage prediction coordinate value is a coordinate value of the communication satellite 120 at the passage prediction time point.

The passage prediction data indicates a model identifier, a passage prediction time point, and a passage prediction coordinate value.

The communication device 121 transmits the passage prediction data to the remaining communication satellites 120 of the plurality of communication satellites 120 via the satellite communication network.

Figure 7:
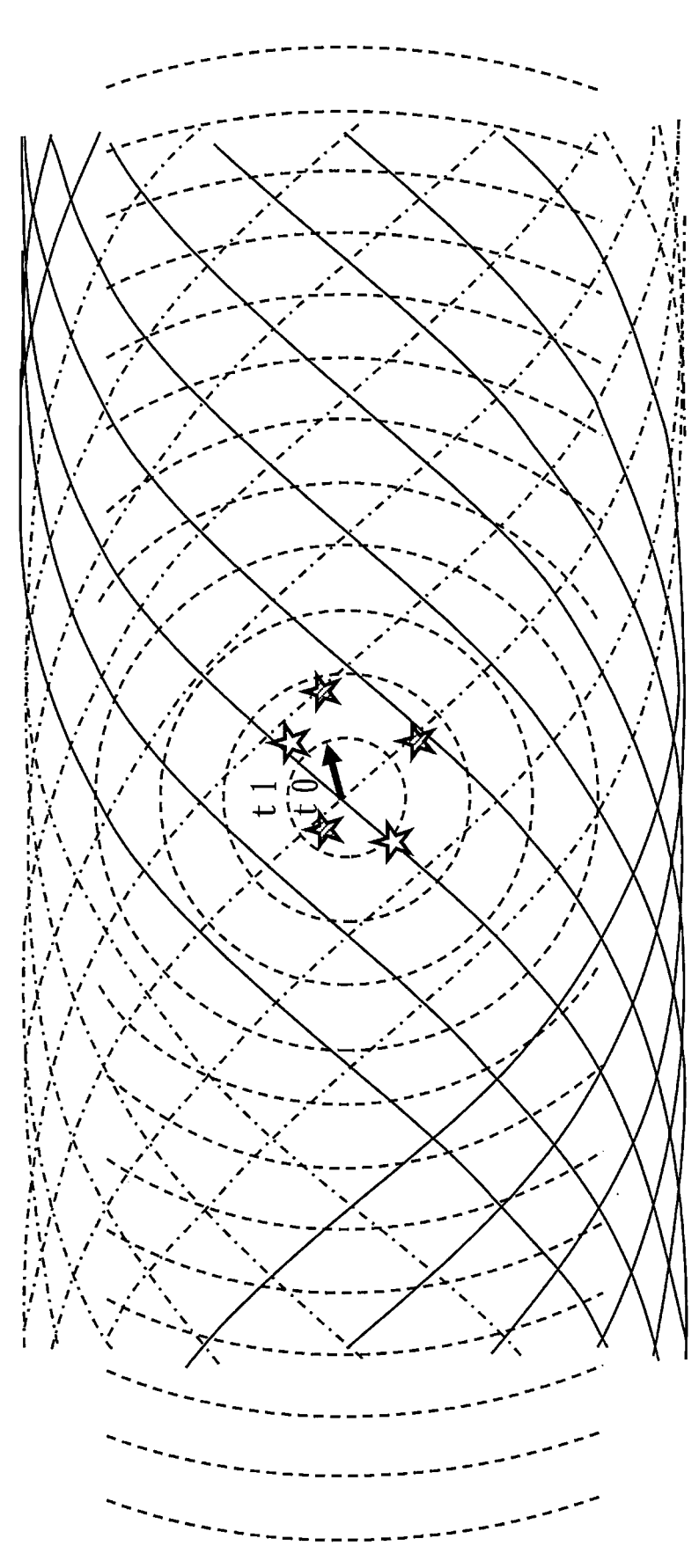
FIG. 7 is an explanatory diagram of transmission of passage prediction data (t1) in Embodiment 1.

In FIG. 7, passage prediction data at time point t1 is transmitted from the communication satellite 120.

Figure 8:
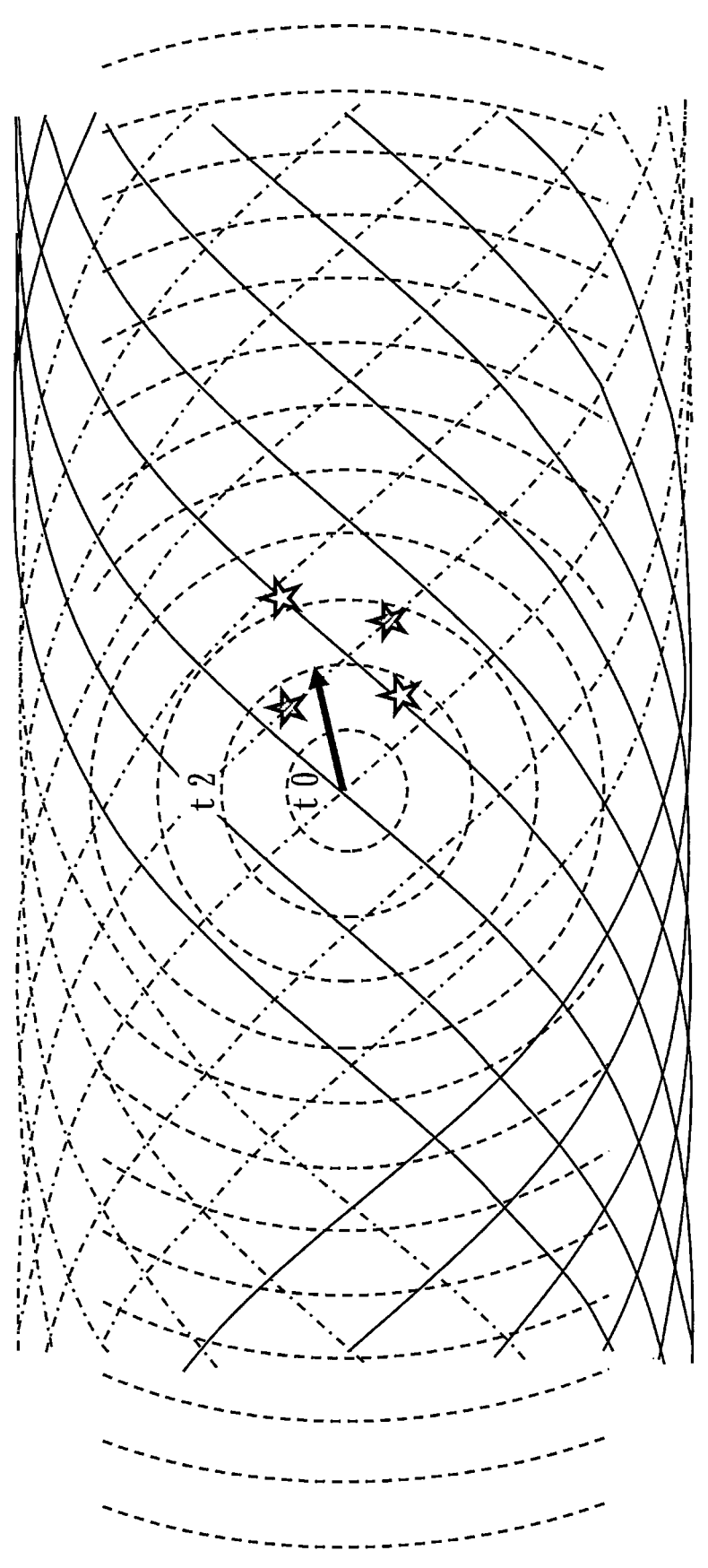
FIG. 8 is an explanatory diagram of transmission of passage prediction data (t2) in Embodiment 1.

In FIG. 8, passage prediction data at time point t2 is transmitted from the communication satellite 120.

Figure 9:
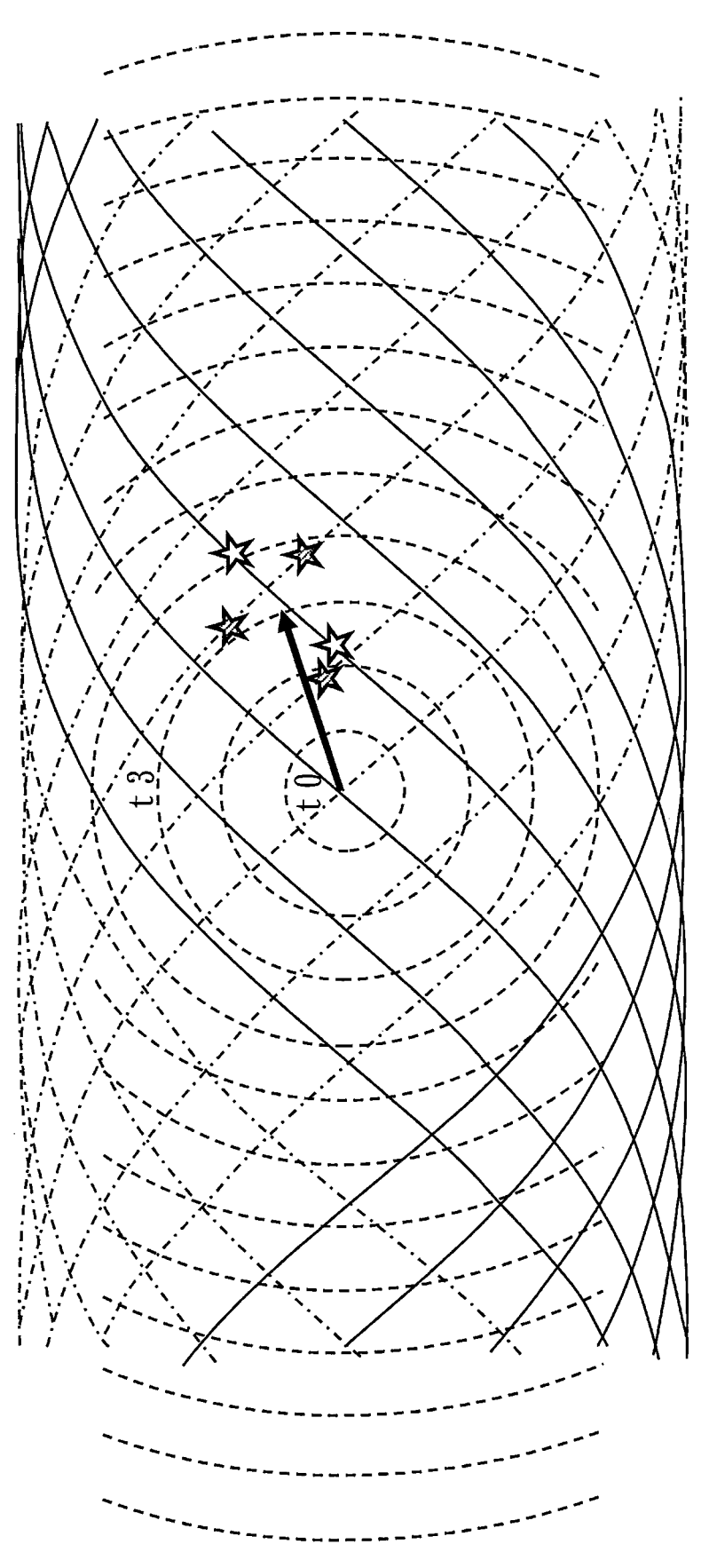
FIG. 9 is an explanatory diagram of transmission of passage prediction data (t3) in Embodiment 1.

In FIG. 9, passage prediction data at time point t3 is transmitted from the communication satellite 120.

Figure 10:
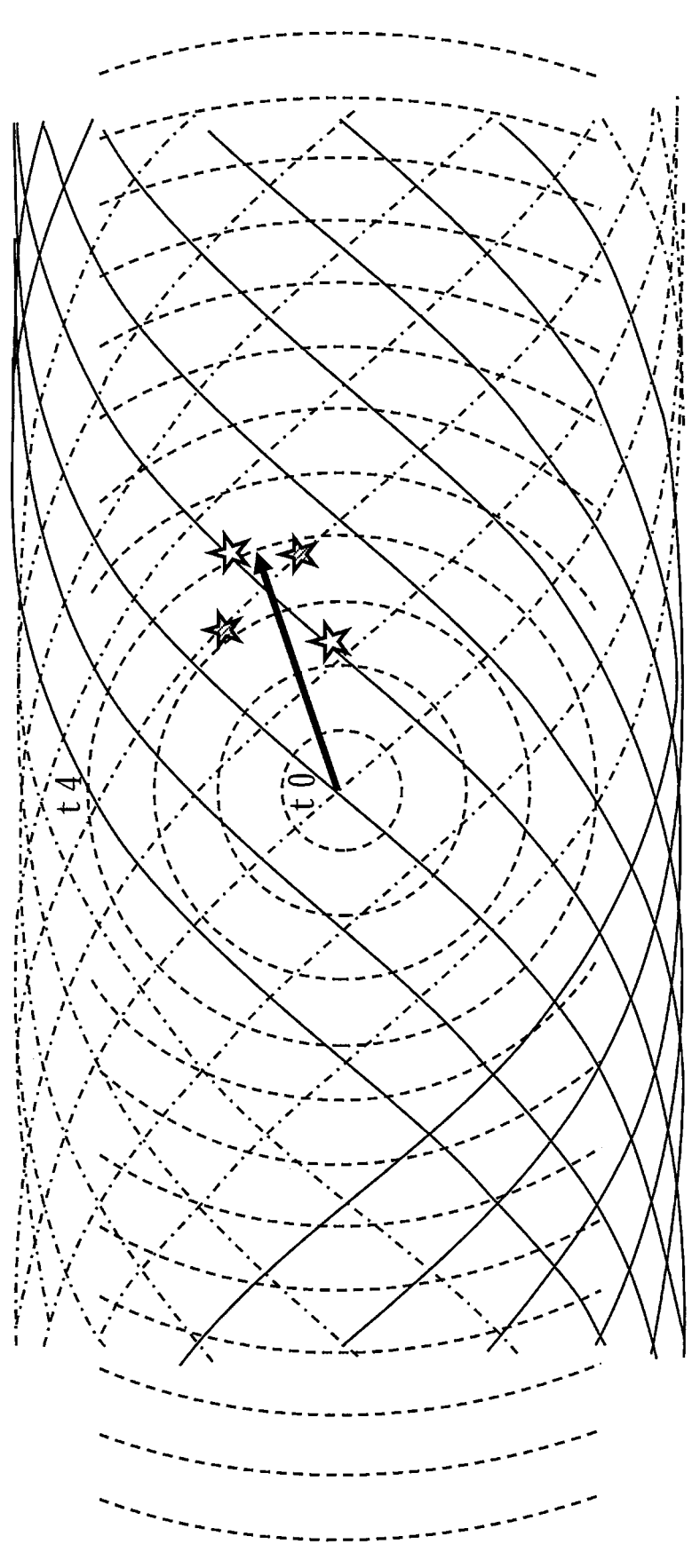
FIG. 10 is an explanatory diagram of transmission of passage prediction data (t4) in Embodiment 1.

In FIG. 10, passage prediction data at time point t4 is transmitted from the communication satellite 120.

Figure 11:
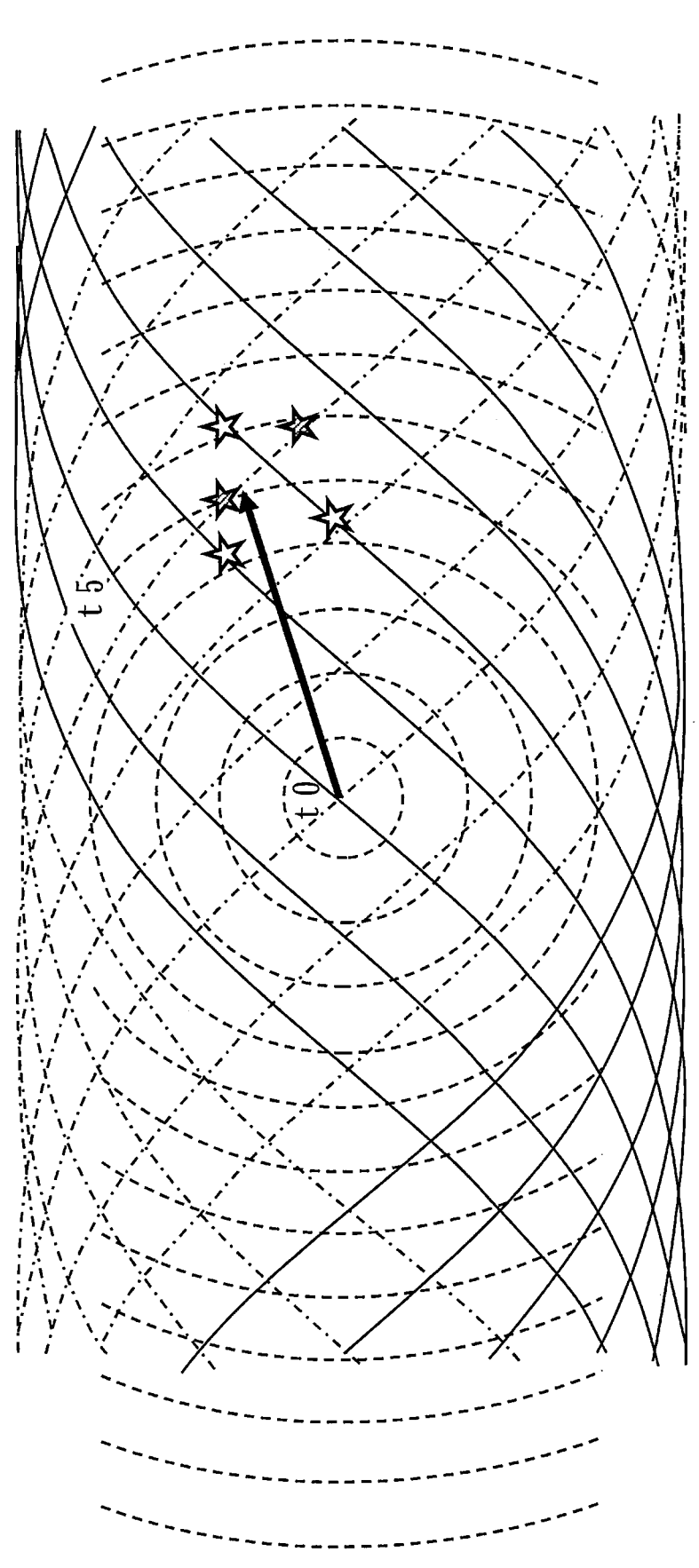
FIG. 11 is an explanatory diagram of transmission of passage prediction data (t5) in Embodiment 1.

In FIG. 11, passage prediction data at time point t5 is transmitted from the communication satellite 120.

From FIG. 7 through FIG. 11, an arrow line represents the prediction path of the target flying object 103.

The passage prediction data at each time point is transmitted by each communication satellite 120.

*Operation (4)*

Each surveillance satellite 110 operates as follows.

When the infrared surveillance device 111 detected a significant high luminance, the surveillance control device 112 generates flying object detection data.

The flying object detection data indicates a detection time point, a detection-source coordinate value, and a line-of-sight vector of the infrared surveillance device 111 at the detection time point, and contains surveillance data at the detection time point.

The detection-source coordinate value is a coordinate value of the surveillance satellite 110 at the detection time point.

The communication device 113 transmits the flying object detection data to the communication satellite 120 located within a communication range.

The surveillance satellite 110 that has transmitted the flying object detection data will be referred to as "detection/surveillance satellite".

Among the plurality of communication satellites 120, a communication satellite located within the communication range of the detection/surveillance satellite will be referred to as "proximity communication satellite".

The proximity communication satellite operates as follows.

The communication device 121 transmits the flying object detection data to the communication satellite 120 being a transmission source of the passage prediction data, via the satellite communication network.

*Operation (5)*

Each communication satellite 120 operates as follows.

When the communication device 121 transmitted the passage prediction data, the communication control device 123 determines whether the communication device 121 received the flying object detection data before the passage prediction time point was passed.

If the communication device 121 is determined as not having received the flying object detection data before the passage prediction time point was passed, the communication device 121 transmits passage prediction cancellation data to the remaining communication devices 121 of the plurality of communication devices 121 via the satellite communication network.

The passage prediction cancellation data is data to cancel passage prediction data.

*Operation (6)*

Each communication satellite 120 operates as follows.

The communication device 121 collects one or more pieces of flying object detection data transmitted from the plurality of surveillance satellites 110 between the time point t 1 which is after the launch time point, and reception time point tm of the flying object detection data.

The analysis device 122 selects one flight path model from among the plurality of flight path models, on a basis of the passage prediction cancellation data. The flight path model to be selected will be referred to as "strongest model".

The analysis device 122 identifies passage prediction data indicating a model identifier of the strongest model and passage prediction time point t(m+1) which is after the reception time point of the flying object detection data, and identifies a communication satellite 120 being the transmission source of the identified passage prediction data.

The communication device 121 transmits individual flying object detection data to the identified communication satellite 120 first.

The communication satellite 120 that is prioritized will be referred to as "priority communication satellite".

A surveillance satellite 110 that is subsequent to the priority communication satellite repeats generation and transmission of new flying object detection data.

The surveillance satellite 110 that is subsequent is a detection/surveillance satellite in which the infrared surveillance device 111 detects a significant high luminance and generates flying object detection data after one "detection/surveillance satellite" generates flying object detection data. As the flying object travels over time, a plurality of subsequent surveillance satellites 110 generate flying object detection data as detection/surveillance satellites, enabling tracking of the flying object over time.

A communication satellite 120 that is subsequent to the priority communication satellite repeats selection of a new strongest model and transmission of individual flying object detection data.

The communication satellite 120 that is subsequent is a communication satellite 120 that transmits flying object detection data after the flying object detection data is received from one communication satellite 120. Transmission of the flying object detection data and reception of the flying object detection data by a subsequent communication satellite 120 are repeated over time by a plurality of subsequent communication satellites 120, so that a communication path of the communication network is formed.

For example, collection of the flying object detection data is realized when all pieces of flying object detection data are transmitted to all the communication satellites 120 via the satellite communication network.

When the strongest models are narrowed down and the flying object detection data is transmitted to a particular communication satellite 120 first, a communication wait time is minimized. As a result, it becomes possible to take a countermeasure against the target flying object 103 quickly with a high success probability.

In a top-down operation system, a standard-practice operation method is that a management center for a communication satellite constellation and a surveillance satellite constellation operates as follows. That is, the management center performs communication route search to extract a communication satellite ID and a surveillance satellite ID, instructs a transmission/reception time point of flying object information, and predicts a flight path on a basis of the collected flying object information. In this case, both of the satellite constellations must be managed integrally.

Meanwhile, in the flying object surveillance system 100, even if the communication satellites 120 of different business operators and surveillance satellites 110 of different business operators coexist and accordingly integral management cannot be performed, the flight path of the target flying object 103 can be predicted.

\*\*\*Operation (7)\*\*\*

Each communication satellite 120 operates as follows.

First, the analysis device 122 performs machine learning of flying object tracking data about a past flying object, using artificial intelligence (AI).

The flying object tracking data indicates at least one out of a launch coordinate value, an arrival coordinate value, a detection wavelength, a jetting interval, a time-series flight altitude, a time-series flight distance, a flying object type, and a propellant type.

The detection wavelength is a wavelength of a detected infrared ray.

The jetting interval is a time interval of jetting.

Next, the analysis device 122 performs complementary analysis of a difference between the strongest model and received flying object detection data with using a learning model obtained by machine learning.

Then, the analysis device 122 corrects the prediction path data on a basis of a result of the complementary analysis.

A flight path based on a flight path model is a typical representative example.

When the target flying object 103 is launched from a transporter erector launcher (TEL) or the like, the actual flight path differs from a flight path based on the flight path model. Therefore, the prediction flight path must be corrected by performing complementary analysis based on record information of flying object tracking.

Even when uncertainty of the flight path remains because various factors are related to each other, if machine learning of the record information is performed using AI, it is possible to correct the prediction flight path appropriately and quickly.

\*\*\*Operation (8)\*\*\*

Each communication satellite 120 operates as follows.

The communication device 121 transmits the launch sensing data to surveillance satellites 110 located within the communication range.

Hence, the launch sensing data is transmitted to each of the plurality of surveillance satellites 110.

Figure 12:
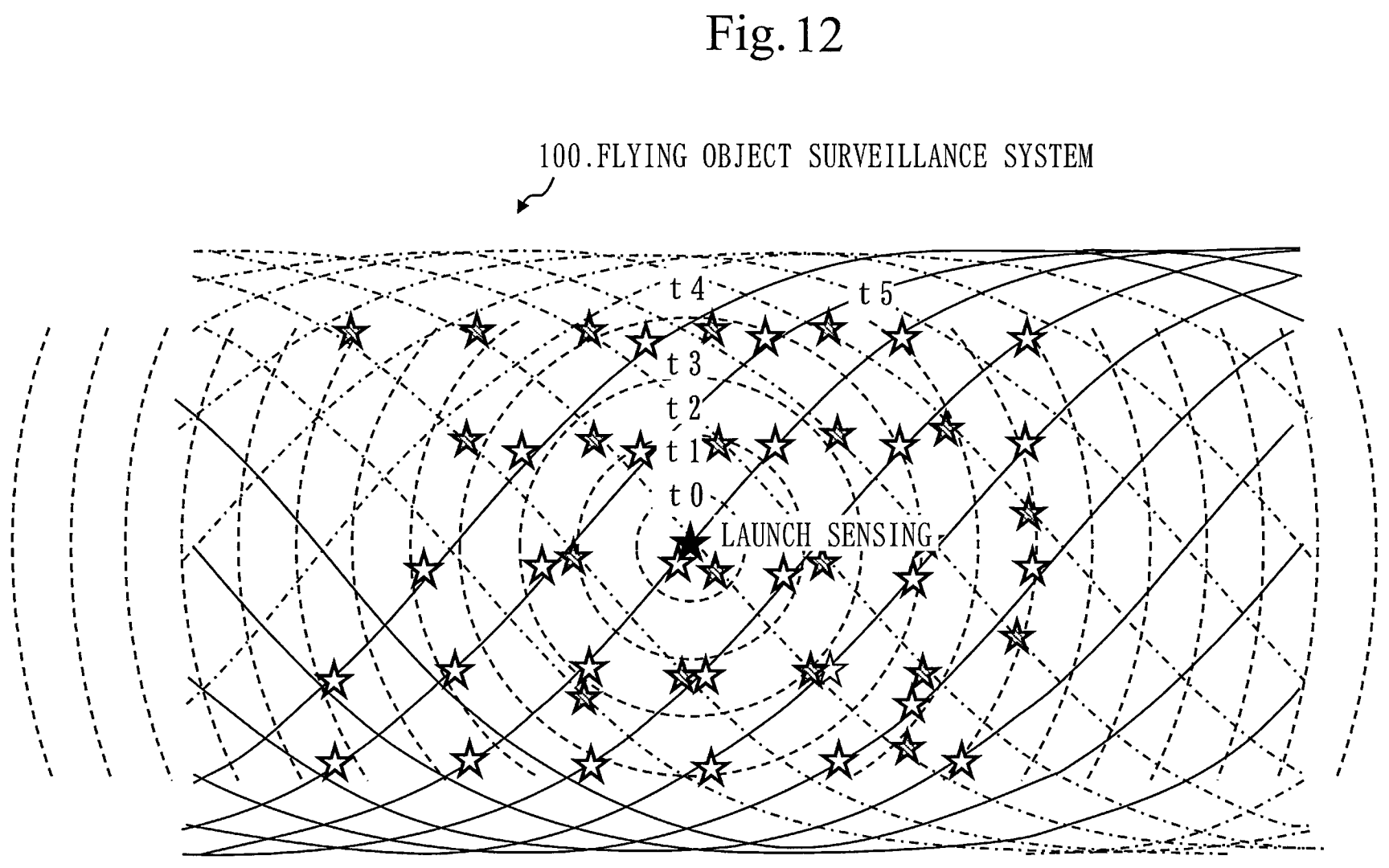

FIG. 12 illustrates a relationship among the plurality of surveillance satellites 110, the plurality of communication satellites 120, and the launch point of the target flying object 103.

In the flying object surveillance system 100, the launch sensing data is transmitted to all the surveillance satellites 110.

\*\*\*Operation (9)\*\*\*

Each surveillance satellite 110 operates as follows.

First, the communication device 113 receives the plurality of flight path models from the ground system 130.

Next, per flight path model, the analysis device 114 sets the launch coordinate value indicated in the launch sensing data to the launch position in the flight profile.

Next, per flight path model, the analysis device 114 calculates an arrival coordinate value of the target flying object 103, an arrival time point of the target flying object 103, and flight coordinate values of the target flying object 103 at individual time points between the launch time point and the arrival time point, on a basis of the flight profile in which the launch coordinate value is set.

Then, per flight path model, the analysis device 114 generates prediction path data of the target flying object 103.

\*\*\*Operation (10)\*\*\*

Each surveillance satellite 110 operates as follows.

The communication device 113 receives orbit data of the surveillance satellite 110 from the ground system 130.

Per flight path model, the analysis device 114 determines whether the surveillance satellite 110 will pass over the target flying object 103 on a basis of orbit data of the surveillance satellite 110 and the prediction path data.

If the analysis device 114 determines that the surveillance satellite 110 will pass over the target flying object 103, the analysis device 114 calculates a passage prediction time point and a passage prediction coordinate value on a basis of the orbit data of the surveillance satellite 110 and prediction path data. Then, the analysis device 114 generates passage prediction data.

The passage prediction time point is a prediction time point at which the surveillance satellite 110 passes over the target flying object 103.

The passage prediction coordinate value is a coordinate value of the surveillance satellite 110 at the passage prediction time point.

The passage prediction data indicates a model identifier, a passage prediction time point, and the passage prediction coordinate value.

The communication device 113 transmits the passage prediction data to the communication satellites 120 located within the communication range.

The communication satellites 120 located within the communication range operate as follows.

The communication device 121 receives the passage prediction data and transmits the passage prediction data to the remaining communication satellites 120 of the plurality of communication satellites 120 via the satellite communication network.

\*\*\*Operation (11)\*\*\*

Each surveillance satellite 110 operates as follows.

When the infrared surveillance device 111 detects a significant high luminance, the surveillance control device 112 generates flying object detection data.

The communication device 113 communicates with the communication satellite 120 located within the communication range so as to transmit the flying object detection data to the surveillance satellite 110 being a transmission source of the passage prediction data via the satellite communication network.

\*\*\*Operation (12)\*\*\*

Each surveillance satellite 110 operates as follows,

When the communication device 113 transmitted the passage prediction data, the communication control device 115 determines whether the communication device 113 received flying object detection data before the passage prediction time point was passed.

If the communication device 113 is determined as not having received the flying object detection data before the passage prediction time point was passed, the communication device 113 communicates with the communication satellites 120 located within the communication range so as to transmit passage prediction cancellation data to the remaining surveillance satellites 110 of the plurality of surveillance satellites 110 via the satellite communication network.

Figure 13:
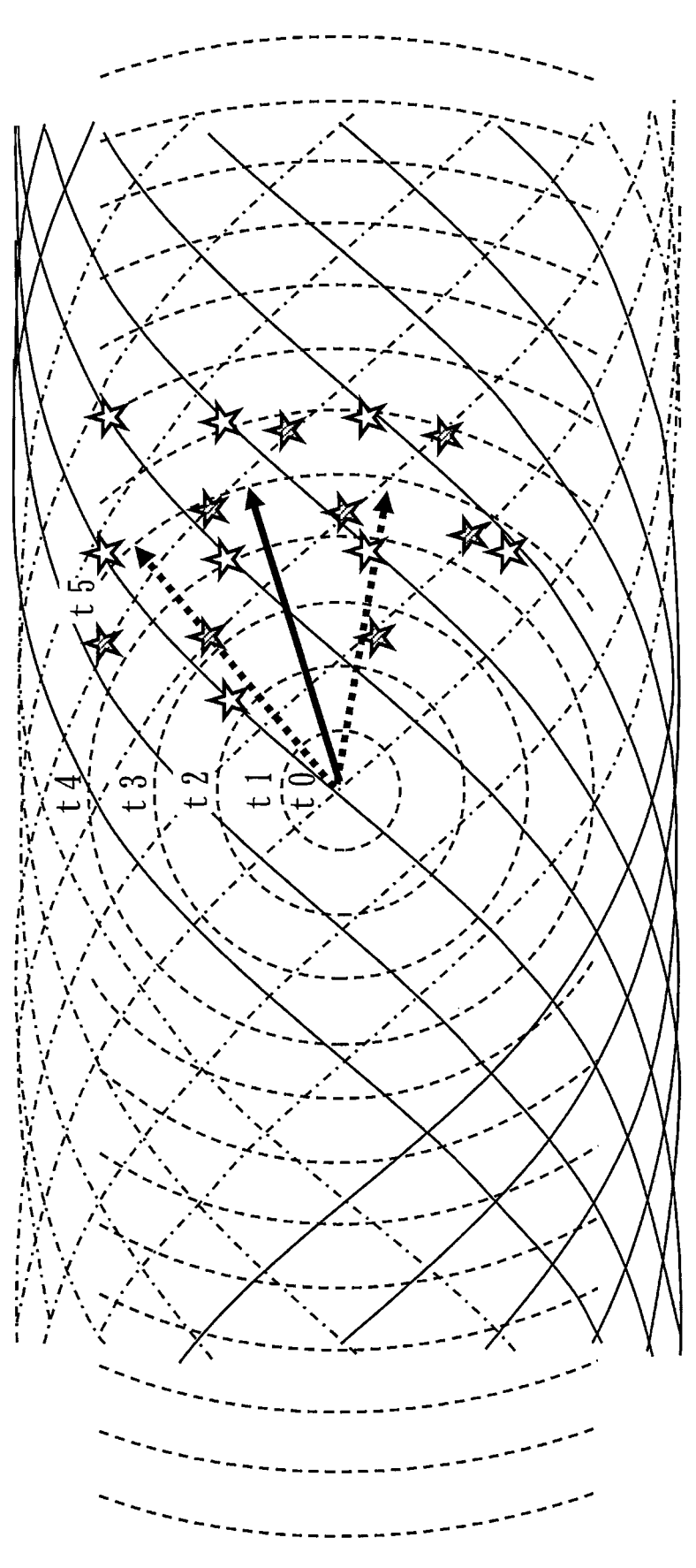
FIG. 13 is a diagram illustrating artificial satellites that have transmitted passage prediction data in Embodiment 1.

FIG. 13 illustrates surveillance satellites 110 and communication satellites 120 that have transmitted the passage prediction data.

Figure 14:
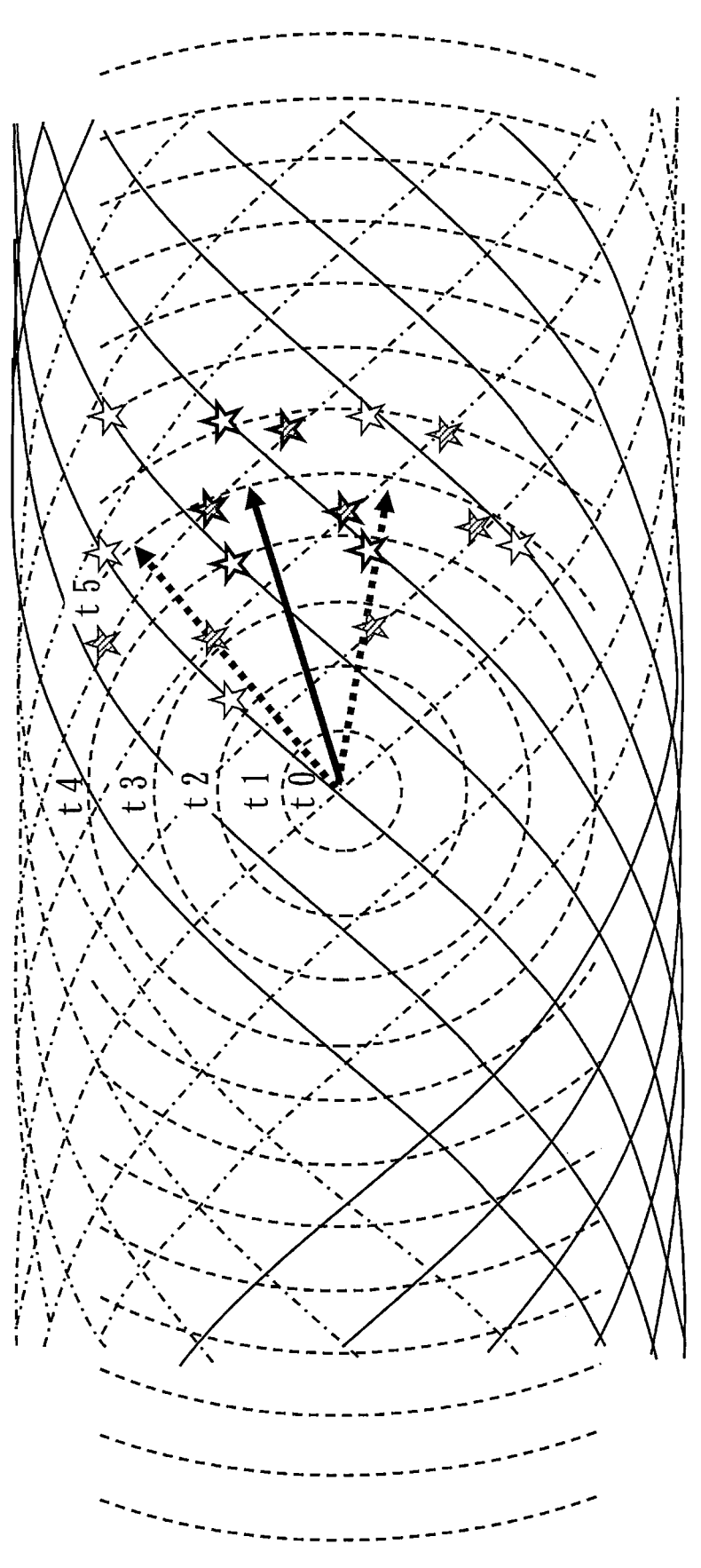
FIG. 14 is a diagram illustrating artificial satellites that have transmitted passage prediction cancellation data in Embodiment 1.

In FIG. 14, star marks hatched with thin lines represent the surveillance satellites 110 and communication satellites 120 that have transmitted the passage prediction cancellation data.

As time passes, flight path models serving as candidates are narrowed down. Hence, a prediction precision of the flight path of the target flying object 103 improves.

\*\*\*Operation (13)\*\*\*

Each communication satellite 120 operates as follows.

The communication device 121 collects one or more pieces of flying object detection data transmitted from the plurality of surveillance satellites 110 between the time point t1 which is after the launch time point, and the reception time point tm of the flying object detection data.

The analysis device 122 selects one flight path model from among the plurality of flight path models, on a basis of the passage prediction cancellation data. The flight path model to be selected will be referred to as "strongest model".

The analysis device 122 identifies passage prediction data indicating a model identifier of the strongest model and passage prediction time point t(m+1) which is after the reception time point of the flying object detection data, and identifies a communication satellite 120 being the transmission source of the identified passage prediction data.

The communication device 121 transmits the flying object detection data to the identified communication satellite 120 first.

The communication satellite 120 that is prioritized will be referred to as "priority communication satellite".

A surveillance satellite 110 that is subsequent to the priority communication satellite repeats generation and transmission of new flying object detection data.

A communication satellite 120 that is subsequent to the priority communication satellite repeats selection of a new strongest model and transmission of each flying object detection data.

To accurately predict the fight path of the target flying object 103, the surveillance satellites are required to track the target flying object 103 continuously.

In order that the subsequent surveillance satellite 110 detects the target flying object 103 on a basis of the flying object detection data of the time point tm, the strongest models are narrowed down, and the flying object detection data is transmitted to a particular communication satellite 120 first. This minimizes a communication wait time. As a result, it becomes possible to detect and track the target flying object 103 quickly with a high success probability.

In a top-down operation system, a standard-practice operation method is that a management center for a communication satellite constellation and a surveillance satellite constellation operates as follows. That is, the management center performs communication route search to extract a communication satellite ID and a surveillance satellite ID, instructs a transmission/reception time point of flying object information, and predicts a flight path on a basis of the collected flying object information. In this case, both of the satellite constellations must be managed integrally.

Meanwhile, in the flying object surveillance system 100, even if the communication satellites 120 of different business operators and surveillance satellites 110 of different business operators coexist and accordingly integral management cannot be performed, the flight path of the target flying object 103 can be predicted.

\*\*\*Operation (14)\*\*\*

Each surveillance satellite 110 operates as follows.

First, the analysis device 114 performs machine learning of flying object tracking data about past flying objects, using artificial intelligence.

Next, using a learning model obtained by machine learning, the analysis device 114 performs complementary analysis of a difference between the strongest model and received flying object detection data.

Then, the analysis device 114 corrects the prediction path data on a basis of a result of complementary analysis.

The analysis device 114 of each surveillance satellite 110 and the analysis device 122 of each communication satellite 120 have an algorithm in common.

The prediction path data corrected by the analysis device 114 coincides with the prediction path data corrected by the analysis device 122.

There is a difference between flight path models and flying object record information. When the prediction flight path is corrected, the passage prediction data must be corrected. However, it takes time and effort to share correction information.

In view of this, the analysis devices (114, 122) having a common algorithm are used. Hence, even when the communication satellite 120 and the surveillance satellite 110 correct the prediction flight paths separately, the communication satellite 120 and the surveillance satellite 110 can achieve a common result. Therefore, a result obtained by updating the passage prediction data is also common between the communication satellite 120 and the surveillance satellite 110. Further, since the flying object detection data can be exchanged reliably at an updated time point and updated position coordinates, tracking of the target flying object 103 can be performed reliably.

\*\*\*Other Operations\*\*\*

Each surveillance satellite 110 and each communication satellite 120 operate as follows.

The analysis device (114, 122) updates the passage prediction data on a basis of prediction flight data that has been corrected.

The communication device (113, 121) transmits/receives flying object detection data.

The analysis device (114, 122) analyzes a success rate of tracking the target flying object 103 by breadth-first search with using artificial intelligence.

The analysis device (114, 122) analyzes the success rate of tracking the target flying object 103 by depth-first search with using the artificial intelligence.

The surveillance control device 112 expresses a detection source coordinate value of the flying object detection data as an address or a symbol.

The communication device (113, 121) broadcasts the flying object detection data by using a non-directional antenna.

The communication device 113 of the surveillance satellite 110 transmits the flying object detection data to the countermeasure asset 104.

For example, the communication device 113 of the surveillance satellite 110 transmits the flying object detection data to the communication satellite 120 located within the communication range so as to transmit the flying object detection data to the ground system 130 via the satellite communication network. Then, in the ground system 130, the communication device 132 receives the flying object detection data, the satellite supervisory device 131 selects the countermeasure asset 104 on a basis of the flying object detection data, and the communication device 132 transmits the flying object detection data to the selected countermeasure asset 104.

Each communication satellite 120 is provided with an optical communication device. The communication device 121 may be the optical communication device, or each communication satellite 120 may be provided with an optical communication device in addition to the communication device 121.

Each surveillance satellite 110 is provided with an optical communication device. The communication device 113 may be the optical communication device, or each surveillance satellite 110 may be provided with an optical communication device in addition to the communication device 113.

The optical communication device is directed to a communication-partner artificial satellite to establish an optical crosslink with the communication-partner artificial satellite.

In intersatellite optical communication, optical communication beams must be aligned with a high precision. For this reason, preparatory work for establishing an optical crosslink must be done before transmission and reception of the flying object detection data.

Since each transmission-side satellite and each reception-side satellite can perform preparation for high-precision optical alignment on a basis of the passage prediction data, a reliable, rapid communication can be realized.

\*\*\*Overview of Embodiment 1\*\*\*

A flying object called an HGV performs intermittent jetting after launch, thereby changing its flight direction.

It is difficult to perform surveillance of a flying object such as HGV with a GEO early warning satellite, and a flying object countermeasure system using an LEO constellation is sought for.

To perform tracking and surveillance of a flying object main body that has stopped jetting after launch, surveillance from a geostationary-orbit satellite lacks temperature detection capability.

Therefore, continuous surveillance by a low-orbit surveillance satellite constellation and information transmission by a low-orbit communication satellite constellation are required.

In the low-orbit surveillance satellite constellation, a large number of low-orbit satellites fly.

In the communication satellite constellation, the flight position is changing constantly.

Therefore, it is difficult to set a communication route with a method according to which a router determines a communication path by referring to an IP address as in a ground-connection internet line. Route search in which transmission and reception are performed between satellites passing in proximity of an orbit at a particular transmission/reception time point is required.

Note that IP stands for Internet Protocol.

In the communication satellite constellation, position coordinates of a ground transmission point and ground reception point are known, and route search for transmitting information from the transmission point to the reception point can be realized in the following manner. That is, orbital information of all communication satellite is grasped. Information transmitting time point is determined. An identifier (ID) of a satellite serving as a communication path, a time point at which the information is transmitted or received, and a position on an orbit where the information is transmitted or received are determined. An instruction signal is transmitted to each satellite.

A plurality of satellites are deployed within the same orbital plane, and each satellite communicates with preceding and subsequent satellites, thereby forming an annular communication network. Each of a large number of orbital planes that are dispersed in a longitudinal direction forms an annular communication network. As inter-orbit communication networks are formed on the large number of orbital planes, a global exhaustive communication network can be formed.

If an instruction signal for each satellite is transmitted to a communication satellite flying above the ground facility, the instruction signal can be transmitted to all the satellites via the communication network.

In the flying object countermeasure system, the launch time point, the ground or marine launch position coordinates, the flight path, the landing time point, and the landing position coordinates are all unknown.

For this reason, in the surveillance satellite constellation, the launch time point and the launch position coordinates are measured by performing launch sensing, and tracking and surveillance are performed by a subsequent surveillance satellite. Then, flight path prediction and landing position coordinate prediction are performed.

In this prediction, the communication satellite constellation is utilized to transmit to the subsequent satellite the flying object information acquired by a first surveillance satellite that has sensed the launch.

However, in order to transmit the flying object information from the first surveillance satellite to the communication satellite and to transmit the flying object information to the subsequent surveillance satellite via the communication network, it is required to determine an ID of each surveillance satellite, an ID of the communication satellite, the time point at which transmission/reception is performed, and an on-orbit position at which transmission/reception is performed.

Moreover, after the subsequent surveillance satellite acquires the tracking information of the flying object, it is still required to repeat a process of transmitting the flying object information to a further subsequent surveillance satellite via the communication network of the communication satellite constellation.

This complicates communication route search.

Furthermore, it is required to transmit the flying object information to a ground or marine countermeasure asset before the flying object lands finally, and to take a countermeasure action using the countermeasure asset.

Since the landing time point and the landing position coordinates are unknown, however, it is required to repeat transmission and reception of the flying object information in the surveillance satellites and the communication satellites so as to perform tracking and surveillance of the flying object. Then, it is required to predict the flight path and to transmit the flying object information to a countermeasure asset deployed in proximity to a landing prediction position.

For this purpose, flight path prediction is required in addition to communication route search.

According to a traditional technique for developing a mega-system, a water fall approach that expands a result of a high-order system design to a low-order subsystem is adopted.

Hence, the standard approach is to perform communication route search and flight path prediction in a ground system that centrally manages the orbital information of all the surveillance satellites and all the communication satellites, and to transmit instruction information in a top-down manner to all the satellites related to transmission/reception of the flying object information.

However, to realize a surveillance satellite constellation which performs surveillance of the whole earth constantly and continuously and a communication satellite constellation which forms a global exhaustive satellite communication network, an enormous number of satellites are required. Accordingly, it is difficult to construct the entire system in a top-down manner.

In view of this, it is hoped that the surveillance satellites and the communication satellites are maintained by a plurality of business operators, an operation method and a communication interface for the surveillance satellites and the communication satellites are standardized, and an ultimate objective of performing countermeasure against a flying object is realize by putting subsystems together.

In Embodiment 1, a flying object tracking system is provided with paying attention to the evolution of cloud environment, distributed computing, and artificial intelligence (AI), instead of carrying out integral operation of the satellite constellation in a top-down manner.

In Embodiment 1, the flying object tracking system utilizes distributed computing that makes the best use of the AI techniques, transmits/receives the flying object information by distributed management of the satellites, and predicts the flight path.

For proposing Embodiment 1, attention was paid to route search methods and the like adopted in earthquake early warning, behavior of the quarter back in American football, AI Shogi, and the Internet.

When an earthquake wave is observed at a position remote from the earthquake source, a P-wave is the first wave to be observed, and an S-wave is the wave to be observed next while the P-wave continues.

The terms "P-wave" and "S-wave" come from a difference in propagation speed of the earthquake waves.

Note that P-wave signifies Primary Wave.

Note that S-wave signifies Secondary Wave.

The earthquake early warning is broadcast after the P-wave arriving at a high speed is detected, and alerts people to be prepared for the S-wave.

In the flying object countermeasure system, when the first surveillance satellite senses launch of a flying object, if launch sensing information is transmitted to all the satellites via the globally and exhaustively formed communication network, preparation can be made before the flying object arrives.

Real-time central management of orbital information of all the satellites in the surveillance satellites and the communication satellites involves a huge information amount and high technical difficulty. It is, however, easy for the individual satellite to prepare for a coming flying object on a basis of the satellite's own orbital information.

Even if the flight path of the flying object is unknown, it is possible to discriminate which one the flight possible distance corresponds to among a short distance, a middle distance, and a long distance on a basis of the type of the flying object and the propellant of the flying object which are indicated in foresight information collected in advance, and it is possible to grasp coordinates of a launch position of a ground fixed launcher.

Usually, a landing target is assumed to be a big city or a significant facility. Therefore, a plurality of typical models of flight paths reaching to the landing position can be prepared on a basis of the type of the flying object and the coordinates of the launch position. The flight path model can include altitude fluctuations and flight path changes resulting from intermittent jetting, in addition to the flight direction and the flight distance.

The launch time point of the flying object is a time point at which launch sensing is recognized upon detection of a significant high-temperature object with an infrared surveillance device provided to the first surveillance satellite.

The coordinates of the launch position express a latitude and longitude of a point at which a line-of-sight vector of the infrared surveillance device intersects with a ground surface or a sea surface.

When the flying object is launched, high-temperature air is diffused over a wide area by fogging called plume. Therefore, the flying object can be detected and discriminated easily as a significant high-temperature object.

When start points of individual ones of the plurality of flight path models prepared in advance are aligned with the launch position, a flight position of the flying object that changes as the time passes after the launch can be analyzed per typical flight path model. Therefore, each surveillance satellite and each communication satellite that have acquired the launch sensing information can grasp, per flight path model, whether the flying object will pass in proximity at a relevant time point on a basis of its own orbital information.

If all the satellites use analysis devices that operate with a common algorithm and common flight path models, all the satellites can share the same analysis result even if the individual satellite performs analysis independently. Therefore, satellites that pass in proximity of the flying object at the passage time point of the flying object can grasp the IDs of one another. Then, even if integral analysis is not performed on the ground, flying object information can be transmitted and received by distributed management.

A communication satellite that has received the launch sensing information of the first surveillance satellite may communicate the launch sensing information to all the communication satellites and all the surveillance satellites via the global exhaustive communication network. It is effective to broadcast the launch sensing information to the satellites passing in proximity, with utilizing a non-directional antenna.

Since a subsequent surveillance satellite that has accepted the launch sensing information of the first surveillance satellite can grasp the passage time point and the position coordinates of the flying object in advance, the subsequent surveillance satellite can acquire the flying object information reliably.

Note that a flying object main body that has stopped jetting at the launch stage has been heated to a high temperature due to after heat of jetting, resistance of air, and so on. However, since the plume is not diffused, it is necessary to detect a temperature of the flying object main body. Also, since the temperature of the flying object main body is not so high as that of the plume, a significant temperature condition is appropriately set in advance on a basis of past information and analysis information. In a case of intermittent re-jetting, detection and discrimination can be done easily.

If a communication satellite that has accepted the flying object information of the subsequent surveillance satellite is to transmit the flying object information to all the surveillance satellites and all the communication satellites, disadvantages such as loss of time and information overload occurs. In view of this, transmission destinations of the flying object information must be narrowed down.

A role of a quarterback in American football is judging the game situation, selecting, from among a large number of players who are candidates to receive a passed ball, a player predicted to have a high probability of scoring a touchdown, and passing a ball to this player.

In the flying object tracking system, a satellite refers to its own orbital information and the flight path information of the flying object, and determines that the satellite will pass over the flying object between the time point t1 and the time point tn. In this case, the satellite generates passage prediction information and transmits it to all the satellites via the communication network. The passage prediction information is constituted of the ID of the satellite, a flight path model ID of the flying object, and orbit position coordinates (tk, xk, yk, zk) of the satellite at the passage prediction time point tk.

This provides the same effect as that obtained when the player who is a candidate to receive a passed ball sends a sign to the quarterback.

Hence, the communication satellite that has acquired the flying object information of the subsequent surveillance satellite selects, from among a large number of communication satellites that have transmitted the passage prediction information, a communication satellite predicted to have a high probability of successfully tracking the flying object, and transmits the flying object information to the selected communication satellite.

If the flying object information can be transmitted to a plurality of communication satellites, a priority order about the plurality of communication satellites can be determined.

In recent years, the performance of AI Shogi has improved remarkably.

Making an analogy to AI Shogi is useful for selecting a communication satellite having a high success rate for flying object tracking.

AI Shogi can execute both breadth-first search that searches for a large number of moves in a brute-force manner and depth-first search that deeply searches for several hundreds of moves ahead. Further, AI Shogi can machine-learn past Shogi match cases and can update search algorithm.

The communication satellite that has received the flying object information from the subsequent surveillance satellite or subsequent communication satellite can decide the ID and a priority degree of a satellite to serve as a transmission destination of the flying object information, by executing breadth-first search or depth-first search against the large number of satellites that transmitted the passage prediction information. Immediately after launch sensing, the flight path is not determined yet, so breadth-first search is effective. After the subsequent surveillance satellite performed tracking/surveillance a plurality of number of times, depth-first search is effective.

An inclined-orbit satellite constellation has, in a mid-latitude band, a large number of nodes where intersect an orbit along which a satellite flies northeast above the equator and an orbit along which a satellite flies southeast above the equator. Depending on which satellite, between the satellite flying northeast and the satellite flying southeast, is selected by a communication satellite that transmits flying object information, a communication path afterwards differs, and accordingly the success probability changes. Further, how a timing of transmitting/receiving the flying object information is selected leads to differences of a proximity point and a far point at each of the large number of intersections, and accordingly the success rate of flying object tracking changes.

If the flying object information is transmitted to a countermeasure asset before landing of the flying object so that a preparation time for taking a countermeasure can be secured, flying object tracking will be done successfully.

When the flying object is launched from a ground fixed launcher, modeling of the flight path is easy to perform. When, however, the flying object is launched from a mobile launch pad or the like, it is difficult to prepare a precise flight path model in advance. The mobile launch pad is also called transporter erector launcher (TEL).

Meanwhile, a landing prediction position can be assumed to be a big city or a ground fixed position such as a significant facility.

Therefore, it is possible to detect a difference in landing prediction position based on flying object tracking information of the subsequent satellite by the analysis device, and to correct, on the orbit, information of a flight path model which is prepared on the orbit in advance. By machine-learning past flying object tracking information, the flight path model can be corrected quickly and at a high precision.

The launch position and the landing prediction position can be determined at a high precision if they are expressed with an earth-fixed coordinate system. Also, satellite orbital information can be expressed with an earth-fixed coordinate system called WGS84. WGS84 is employed in a Global Positioning System (GPS) and so on.

If, however, position coordinates are always transmitted/received as position information of a flying object that moves constantly, the information amount becomes enormous. A number of significant digits of the position information affects the position precision directly, and accordingly to raise the significant digits is not recommendable.

In view of this, it will be effective to apply an IP address of the internet line and the router operation.

If the ground fixed launcher and a metropolis or major facility on which a flying object is anticipated to land are discriminated not by position coordinates but by an address or a symbol, the information amount can be reduced.

It is difficult to express a flying object path as an address or a symbol. However, if a communication satellite which transmits the flying object information is regarded as an advanced-feature router provided with AI, it is possible to perform an information degeneracy manipulation such as: extracting only differential information as a relative distance from an address whose position coordinates are known; and using only low-order bits that contribute to position precision as position information and degenerating high-order bits.

*Conceptual Background of Embodiment 1*

A paradigm shift in construction of a space system will be described.

An HGV has an intermittent jetting function.

The advent of the HGV has invalidated an early warning system of a geostationary orbit, and construction of a new early warning system that uses an LEO constellation is in need.

Conventionally, in a technique of constructing a satellite system, it is common to employ a water fall approach with which a subsystem is constructed by allocating features and performances by upper-order design.

On the contrary, a concept of constructing a system by putting together subsystems that are developed independently has been regarded unreasonable.

An approach taken by SDA of the USA aims at implementing a final objective that subsystems which are formed from an official demand and a civilian demand independently of each other cooperate with each other by interface standardization so as to track an HGV.

Note that SDA stands for Space Development Agency.

Behind the motivation is improvement of economic rationality achieved by public-private partnerships for construction of a huge system. In terms of technology, the motivation is the raise in expectations for system construction to be achieved by putting subsystems together owing to the cloud environment, distributed computing, and the evolution of AI techniques.

The expectations for the huge system appear as a need for JADC2 or a need for UDL.

Note that JADC2 signifies Joint All Domain Command & Control.

Note that UDL stands for Unified Data Library.

This signifies nothing but a 180-degree paradigm shift from the system realization in the top-down manner to the system realization in the bottom-up manner.

Although SDA has started Trash 0 procurement, it is unlikely that the feasibility of system development in the bottom-up manner is in sight. It is presumed that a present situation is at the stage of expecting proposals from operators and companies while facing a huge number of problems.

A similar situation may be found in the commercial communications satellite business. In the commercial communications satellite business, the conventional scheme has been for operators to present needs-oriented specifications and for satellite providers to develop the specifications. In recent years, the needs and seeds have become seamless. Operators and providers are repeatedly questioning "what can be done?" and "what do you want?" to each other, and it seems that an "orientation toward full digitalization" is formed vaguely.

A countermeasure system against HGV has a crucial difference in its purpose compared to commercial communications business. Therefore, the countermeasure system against HGV serves as a test of whether system realization in the bottom-up manner will be successful or not.

The anti-collision system of Starlink is intriguing from the viewpoint of integral management of a huge system by distributed computing.

In a mega-constellation in which fly several-thousand aircrafts having a large number of inclined orbit planes at the same orbital altitude, a collision risk exists at all orbital grid points formed in the mid-latitude band. Note that a satellite-to-satellite relative velocity at the grid points is as fast as several kilometers per second.

Therefore, the best approach to ensure flight safety would be to integrally manage the flight positions of all satellites on all orbital planes and to manage the passing timings of satellites at all the grid points.

Meanwhile, with a method provided with an automatic collision avoidance function, it is easy to prevent collisions occurring on the same orbital plane. However, it is supposed to be extremely difficult to realize collision prevention at a speed of several kilometers per second, with distributed computing.

Even if a foreseen single-time collision was avoided by orbiting control of individual satellites, this may result in another collision risk at all grid points. In addition, as the collision risk changes from moment to moment at all grid points due to collision avoidance operations performed separately, it will be hardly possible to realize changes in collision risk by means of distributed computing.

If AI or distributed computing realizes technologies that were considered difficult to achieve with conventional knowledge, it is a threat to conventional satellite providers.

In classical music, a large orchestra is led by a conductor while a small string quartet is controlled by training and nonverbal communication instead of a conductor.

A question of whether a paradigm shift is successful or not is similar to a question "is it possible to lead a large orchestra by nonverbal communication?".

"Nonverbal communication" in a satellite system corresponds to "distributed computing and ultra-high-speed processing of communication". Real-time optical communication is highly likely to hold the key to an intersatellite ultra-high-speed communication network.

Artificial intelligence AI will be described below.

Learning types of neural networks of artificial intelligence AI can be divided into supervised learning in which optimization to a problem is performed by inputting a teacher signal (correct answer), and unsupervised learning that does not require a teacher signal.

By learning flying object types, propellant types, and a plurality of typical patterns of flight models in advance as a teacher model, inferring actual measurement data based on acquiring orbital information by launch sensing can be performed easily and quickly. As a result of the inference, a flying object path prediction and estimation of a landing position are performed.

However, in order to predict, at the launch sensing stage, a flight path of a flying object whose flight direction is unknown, it is necessary to perform tracking and surveillance of the flying object with a subsequent surveillance satellite. Also, in order to transmit the launch sensing information to the subsequent surveillance satellite, the launch sensing information must be transmitted via a communication network formed of communication satellites.

In a communication network formed of a communication satellite constellation, since the flight positions of the communication satellites change from moment to moment, it is required to perform optimum communication route search so as to specify an ID of a communication satellite which transmits/receives the flying object information, and a transmission/reception time point. This situation occurs also in transmission and reception of flying object information between a surveillance satellite and a communication satellite.

To carry out optimum route search with the ground system, it is required to command-transmit a time point at which the flying object information is transmitted/received, and a satellite ID, to the surveillance satellite and the communication satellite. Then, however, a communication network for command transmission becomes an issue.

Hence, it is rational if the communication satellite is equipped with an AI-based analysis device, searches for an optimal route on the orbit, and generates a command on the orbit and communicates the command to the communication satellites that make up the communication route.

As a technique for searching for the optimum route on the orbit, an optimum route search known as the Dijkstra method, which uses an algorithm is effective. With the static Dijkstra method, weighting of each route does not change, but in a communication network formed of a communication satellite constellation, weighting of each route changes from a time point to another due to a change in flight position of the communication satellite. Therefore, an operation is repeated in which for each individual communication satellite that performs optimum route search while updating the orbital information, a communication satellite that has received the flying object information performs optimum route search and transmits the flying object information to the next communication satellite.

In a communication network formed of inclined-orbit satellites, satellites can be roughly divided into satellites moving northward from the southern hemisphere to the northern hemisphere and satellites moving southward from the northern hemisphere to the southern hemisphere. Which communication route is the optimal between the northward route and the southward route can be determined on the orbit.

Figure 15:
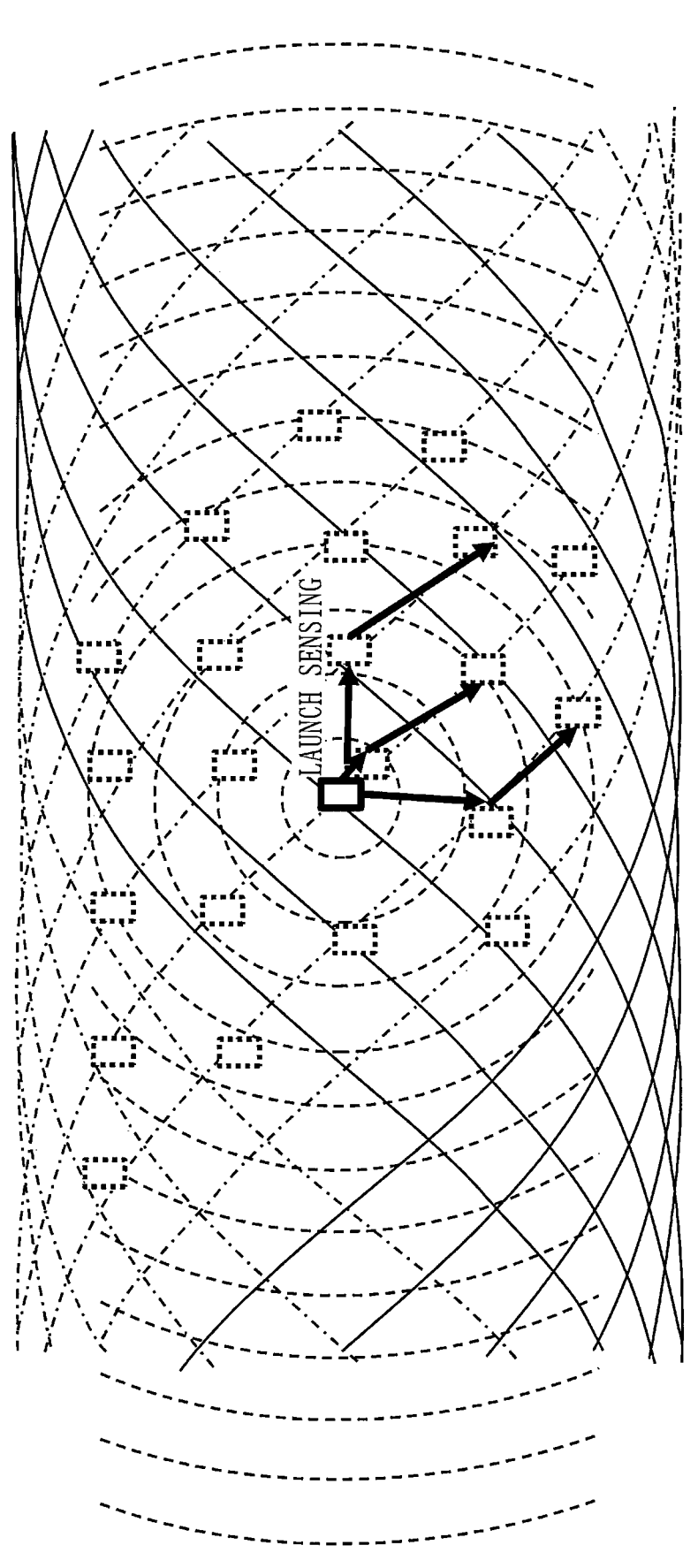
FIG. 15 is a diagram illustrating communication routes which are southward routes in Embodiment 1.

FIG. 15 illustrates communication routes which are southward routes.

Figure 16:
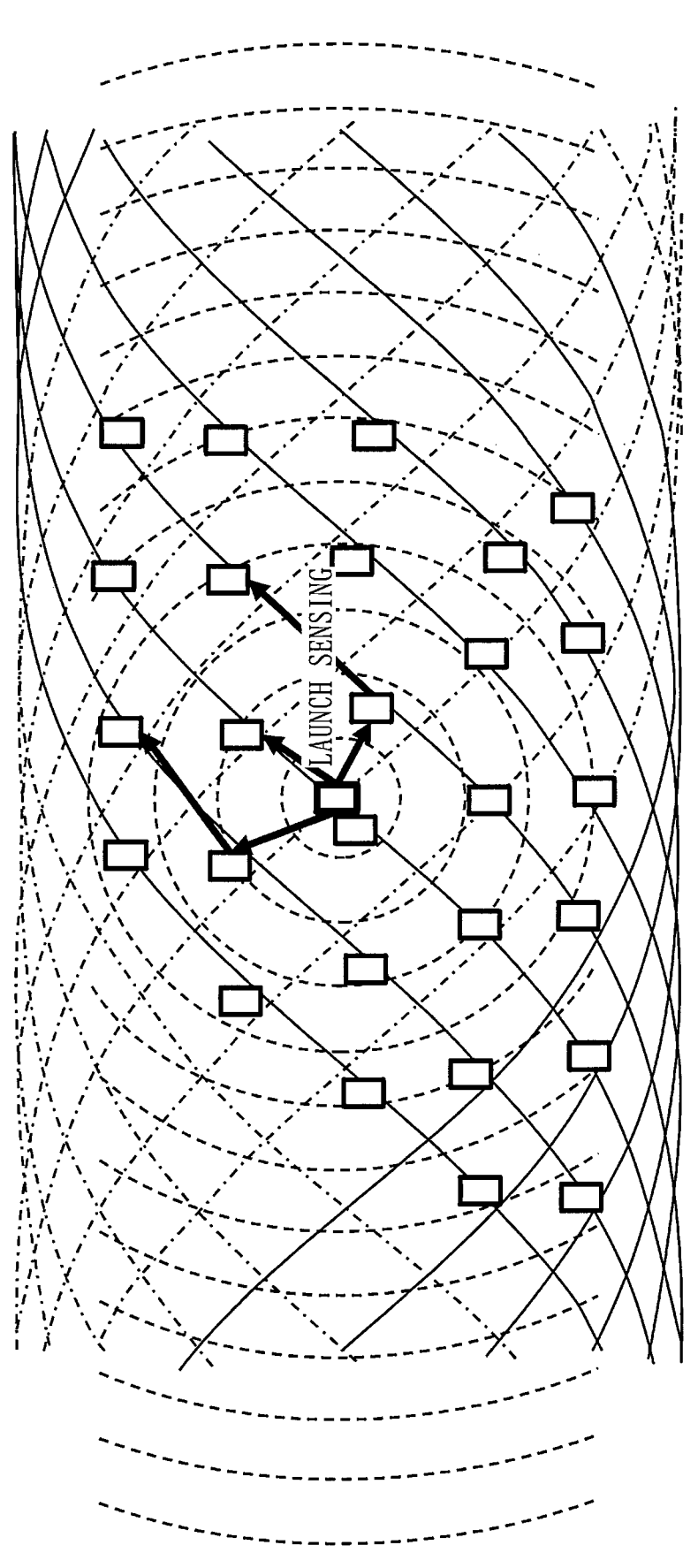
FIG. 16 is a diagram illustrating communication routes which are northward routes in Embodiment 1.

FIG. 16 illustrates communication routes which are northward routes.

As route search, breadth-first search and depth-first search are known. Regarding launch sensing information, transmitting flying object information quickly to the communication network by breadth-first search is prioritized. At a stage where tracking has been repeated by subsequent satellites and the flight direction can be roughly estimated, it is rational to perform depth-first search.

Figure 17:
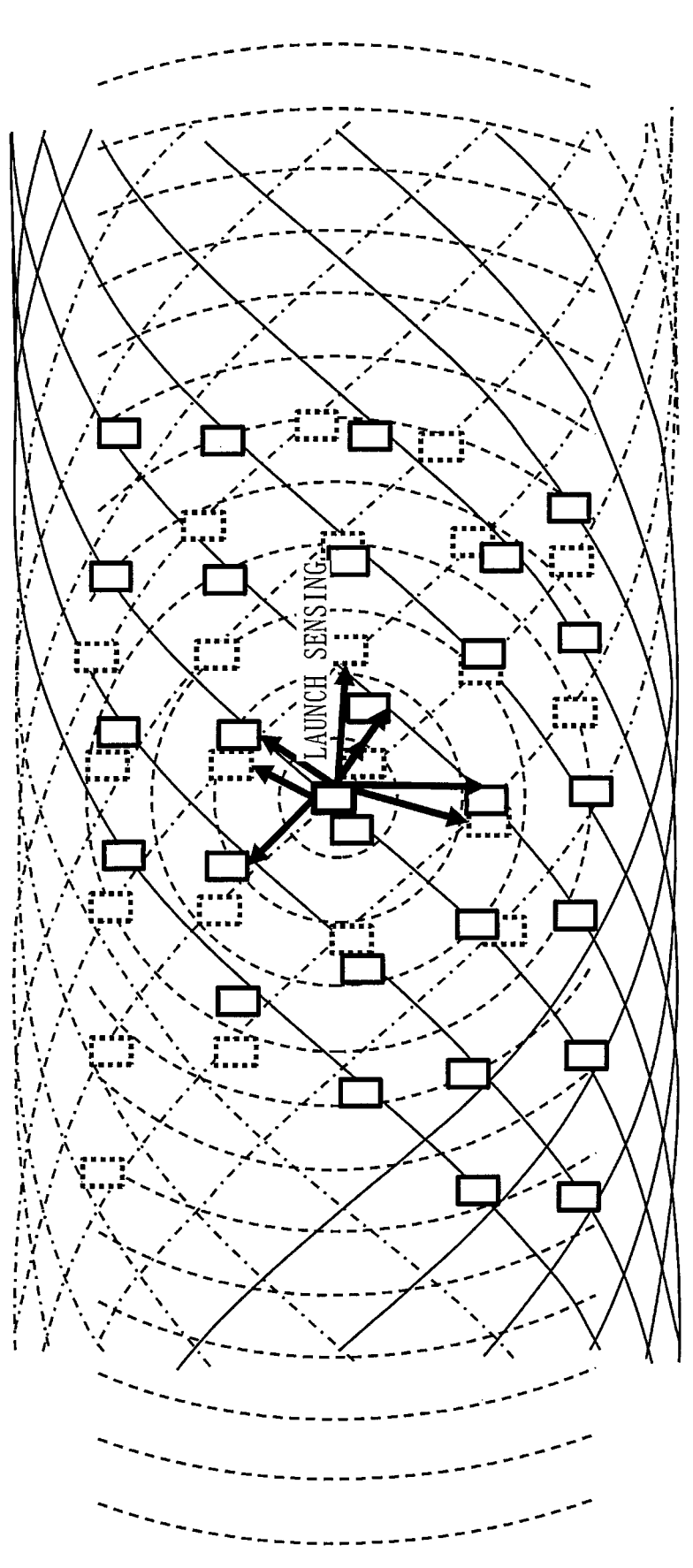
FIG. 17 is a diagram illustrating how breadth-first search is carried out in Embodiment 1.

FIG. 17 illustrates how breadth-first search is carried out.

FIG. 18 illustrates how depth-first search is carried out.

In the flying object tracking system, tracking and surveillance of a flying object is performed while flight path prediction by the above machine learning and Dijkstra route search are repeated, and the final landing position is inferred.

FIG. 19 illustrates an overview of the flying object tracking system.

Further, after flying object tracking is repeated, machine learning is performed on a record of past flying object tracking, and deep learning is performed on cases of flying object behavior that are different from a plurality of flying object models used as the teacher model. This can improve precision in predicting the path of the flying object and can increase speed of making prediction.

The flight direction and distance of a flying object launched from a transporter erector launcher (TEL) or the like instead of from a fixed launcher are different from those of a typical flight model. Hence, it is effective to complement the orbital model by deep learning of actual measurement data.

FIG. 20 illustrates an overview of the flying object tracking system.

*Supplementation to Embodiment 1* Embodiment 1 is an exemplification of a preferred mode and is not intended to limit the technical scope of the present disclosure. Embodiment 1 may be practiced partly, or may be practiced in combination with another embodiment.

REFERENCE SIGNS LIST

100: flying object surveillance system; 101: surveillance satellite constellation; 102: communication satellite constellation; 103: target flying object; 104: countermeasure asset; 110: surveillance satellite; 111: infrared surveillance device; 112: surveillance control device; 113: communication device; 114: analysis device; 115: communication control device; 120: communication satellite; 121: communication device; 122: analysis device; 123: communication control device; 130: ground system; 131: satellite supervisory device; 132: communication device; 133: surveillance database.

The invention claimed is:

1. A flying object surveillance system comprising:
a surveillance satellite constellation constituted of a plurality of surveillance satellites;
a communication satellite constellation constituted of a plurality of communication satellites; and
a surveillance database to store a plurality of flight path models for a plurality of flight paths of a flying object,
each of the plurality of surveillance satellites comprising:
an infrared surveillance device to monitor infrared rays and to detect brightness;
a surveillance control device to generate launch sensing data when the infrared surveillance device detected a significant high luminance, the launch sensing data indicating a launch time point corresponding to a detection time point at which the significant high luminance was detected, a launch coordinate value expressing a position at which the significant high luminance was detected, and a line-of-sight vector of the infrared surveillance device at the detection time point, the launch sensing data containing surveillance data at the detection time point; and
a communication device to transmit the launch sensing data,
each of the plurality of communication satellites comprising a communication device to communicate the launch sensing data,
wherein, among the plurality of communication satellites, in a communication satellite that passes through a point in a communication range with respect to a surveillance satellite, among the plurality of surveillance satellites, to transmit the launch sensing data, the communication device receives the launch sensing data and transmits the launch sensing data to remaining communication satellites of the plurality of communication satellites via a satellite communication network formed of the communication satellite constellation,
wherein the plurality of flight path models individually contain a different model identifier and a flight profile which expresses a different flight path, and
wherein the flight profile expresses the flight path by indicating a relationship among a launch position, a flight direction, a time-series flight distance, and a time-series flight altitude.

2. The flying object surveillance system according to claim 1, further comprising a ground system,
wherein the ground system comprises the surveillance database.

3. The flying object surveillance system according to claim 2, wherein orbit data indicating orbital information of each of the plurality of surveillance satellites and orbit data indicating orbital information of each of the plurality of communication satellites are stored in the surveillance database.

4. The flying object surveillance system according to claim 1, wherein the communication device of each of the plurality of communication satellites transmits the launch sensing data to the surveillance satellites located within the communication range, so that the launch sensing data is transmitted to each of the plurality of surveillance satellites.

5. The flying object surveillance system according to claim 4,
wherein each of the plurality of surveillance satellites comprises an analysis device, and
wherein in each of the plurality of surveillance satellites, the communication device receives the plurality of flight path models from the surveillance database, and
per flight path model, the analysis device sets the launch coordinate value to the launch position in the flight profile, calculates an arrival coordinate value of a target flying object, an arrival time point of the target flying object, and flight coordinate values of the target flying object at individual time points between the launch time point and the arrival time point, and generates prediction path data of the target flying object.

6. The flying object surveillance system according to claim 5, wherein in each of the plurality of surveillance satellites, per flight path model, the analysis device determines whether the surveillance satellite will pass over the target flying object on a basis of orbit data of the surveillance satellite and the prediction path data, and if the analysis device determines that the surveillance satellite will pass over the target flying object, the analysis device calculates a passage prediction coordinate value being a coordinate value of the surveillance satellite at a passage prediction time point, and generates passage prediction data indicating the model identifier, the passage prediction time point, and the passage prediction coordinate value, the communication device transmits the passage prediction data to the communication satellites located within the communication range, and in the communication satellites located within the communication range, the communication device receives the passage prediction data and transmits the passage prediction data to the remaining communication satellites of the plurality of communication satellites via the satellite communication network.

7. The flying object surveillance system according to claim 6, wherein in each of the plurality of surveillance satellites, when the infrared surveillance device detected the significant high luminance, the surveillance control device generates flying object detection data indicating the detection time point, a detection-source coordinate value being a coordinate value of the surveillance satellite at the detection time point, and the line-of-sight vector of the infrared surveillance device at the detection time point, the flying object detection data containing the surveillance data at the detection time point, and the communication device communicates with the communication satellite located within the communication range so as to transmit the flying object detection data to the surveillance satellite being a transmission source of the passage prediction data via the satellite communication network.

8. The flying object surveillance system according to claim 7, wherein each of the plurality of surveillance satellites comprises a communication control device, and wherein in each of the plurality of surveillance satellites, when the communication device transmitted the passage prediction data, the communication control device determines whether the communication device received flying object detection data before the passage prediction time point was passed, and if the communication device is determined as not having received the flying object detection data before the passage prediction time point was passed, the communication device communicates with the communication satellites located within the communication range so as to transmit passage prediction cancellation data for cancelling the passage prediction data to the remaining surveillance satellites of the plurality of surveillance satellites via the satellite communication network.

9. The flying object surveillance system according to claim 8, wherein each of the plurality of communication satellites comprises an analysis device, and wherein in each of the plurality of communication satellites, the communication device collects one or more pieces of flying object detection data transmitted from the plurality of surveillance satellites between a time point which is after the launch time point, and a reception time point of the flying object detection data, the analysis device selects one flight path model as a strongest model, from among the plurality of flight path models, on a basis of the passage prediction cancellation data, and identifies the surveillance satellite being a transmission source of passage prediction data indicating a model identifier of the strongest model and the passage prediction time point which is after the reception time point, and the communication device transmits individual flying object detection data to the identified surveillance satellite first.

10. The flying object surveillance system according to claim 9, wherein the surveillance satellite that is subsequent to the identified surveillance satellite repeats generation and transmission of new flying object detection data, and wherein the communication satellite that is subsequent to the identified surveillance satellite repeats selection of a new strongest model and transmission of each flying object detection data.

11. The flying object surveillance system according to claim 10, wherein each of the analysis device performs machine learning of flying object tracking data about a past flying object, using artificial intelligence, performs complementary analysis of a difference between the strongest model and received flying object detection data with using a learning model obtained by the machine learning, and corrects the prediction path data on a basis of a result of the complementary analysis.

12. The flying object surveillance system according to claim 11, wherein the flying object tracking data indicates at least one of a launch coordinate value, an arrival coordinate value, a detection wavelength, a jetting interval, a time-series flight altitude, a time-series flight distance, a flying object type, and a propellant type.

13. The flying object surveillance system according to claim 11, wherein each of the plurality of communication satellites comprises an analysis device whose algorithm is common with the analysis device of each of the plurality of surveillance satellites, and wherein the prediction path data corrected by the analysis device of the communication satellite coincides with the prediction path data corrected by the analysis device of the surveillance satellite.

14. The flying object surveillance system according to claim 13, wherein in each surveillance satellite and each communication satellite, the analysis device updates the passage prediction data on a basis of the prediction path data corrected, and the communication device transmits/receives the flying object detection data.

15. The flying object surveillance system according to claim 1, wherein each of the plurality of communication satellites comprises an analysis device, and wherein in each of the plurality of communication satellites, the communication device receives the plurality of flight path models from the surveillance database, and per flight path model, the analysis device sets the launch coordinate value to the launch position in the flight profile, calculates an arrival coordinate value of a target flying object, an arrival time point of the target flying object, and flight coordinate values of the target flying object at individual time points between the launch time point and the arrival time point, and generates prediction path data of the target flying object.

16. The flying object surveillance system according to claim 15, wherein the analysis device analyzes a success rate of tracking the target flying object by breadth-first search with using artificial intelligence.

17. The flying object surveillance system according to claim 15, wherein the analysis device analyzes a success rate of tracking the target flying object by depth-first search with using artificial intelligence.

18. The flying object surveillance system according to claim 15, wherein in each of the plurality of communication satellites, per flight path model, the analysis device determines whether the communication satellite will pass over the target flying object on a basis of orbit data of the communication satellite and the prediction path data, and if the analysis device determines that the communication satellite will pass over the target flying object, the analysis device calculates a passage prediction coordinate value being a coordinate value of the communication satellite at a passage prediction time point, and generates passage prediction data indicating the model identifier, the passage prediction time point, and the passage prediction coordinate value, and the communication device transmits the passage prediction data to the remaining communication satellites of the plurality of communication satellites via the satellite communication network.

19. The flying object surveillance system according to claim 18, wherein in each of the plurality of surveillance satellites, when the infrared surveillance device detected the significant high luminance, the surveillance control device generates flying object detection data indicating the detection time point, a detection-source coordinate value being a coordinate value of the surveillance satellite at the detection time point, and the line-of-sight vector of the infrared surveillance device at the detection time point, the flying object detection data containing the surveillance data at the detection time point, the communication device transmits the flying object detection data to the communication satellite located within the communication range, and in the communication satellite located within the communication range, the communication device transmits the flying object detection data to the communication satellite being a transmission source of the passage prediction data, via the satellite communication network.

20. The flying object surveillance system according to claim 19, wherein the detection source coordinate value of the flying object detection data is expressed as an address or a symbol.

21. The flying object surveillance system according to claim 19, wherein the communication device in each of the surveillance satellites broadcasts the flying object detection data by using a non-directional antenna.

22. The flying object surveillance system according to claim 19, wherein the flying object detection data is transmitted to a countermeasure asset.

23. The flying object surveillance system according to claim 19, wherein each of the plurality of communication satellites comprises a communication control device, and wherein in each of the plurality of communication satellites, when the communication device transmitted the passage prediction data, the communication control device determines whether the communication device received the flying object detection data before the passage prediction time point was passed, and if the communication device is determined as not having received the flying object detection data before the passage prediction time point was passed, the communication device transmits passage prediction cancellation data for cancelling the passage prediction data to the remaining communication satellites of the plurality of communication satellites via the satellite communication network.

24. The flying object surveillance system according to claim 23, wherein in each of the plurality of communication satellites, the communication device collects one or more pieces of flying object detection data transmitted from the plurality of surveillance satellites between a time point which is after the launch time point, and a reception time point of the flying object detection data, the analysis device selects one flight path model as a strongest model, from among the plurality of flight path models, on a basis of the passage prediction cancellation data, and identifies the communication satellite being a transmission source of passage prediction data indicating a model identifier of the strongest model and the passage prediction time point which is after the reception time point, and the communication device transmits individual flying object detection data to the identified communication satellite first.

25. The flying object surveillance system according to claim 24, wherein the surveillance satellite that is subsequent to the identified communication satellite repeats generation and transmission of new flying object detection data, and wherein the communication satellite that is subsequent to the identified communication satellite repeats selection of a new strongest model and transmission of individual flying object detection data.

26. The flying object surveillance system according to claim 25, wherein the analysis device performs machine learning of flying object tracking data about a past flying object, using artificial intelligence, performs complementary analysis of a difference between the strongest model and received flying object detection data with using a learning model obtained by the machine learning, and corrects the prediction path data on a basis of a result of the complementary analysis.

27. The flying object surveillance system according to claim 26, wherein the flying object tracking data indicates at least one out of a launch coordinate value, an arrival coordinate value, a detection wavelength, a jetting interval, a time-series flight altitude, a time-series flight distance, a flying object type, and a propellant type.

28. The flying object surveillance system according to claim 26, wherein each of the plurality of surveillance satellites comprises an analysis device whose algorithm is common with the analysis device of each of the plurality of communication satellites, and wherein the prediction path data corrected by the analysis device of the surveillance satellite coincides with the prediction path data corrected by the analysis device of the communication satellite.

29. The flying object surveillance system according to claim 28, wherein in each surveillance satellite and each communication satellite, the analysis device updates the passage prediction data on a basis of the prediction path data corrected, and the communication device transmits/receives the flying object detection data.

30. The communication satellite used in the flying object surveillance system according to claim 1.

31. The surveillance satellite used in the flying object surveillance system according to claim 1.

\* \* \* \* \*